United States Patent
Garthwaite

(10) Patent No.: US 6,185,581 B1
(45) Date of Patent: Feb. 6, 2001

(54) TRAIN-ALGORITHM-BASED GARBAGE COLLECTOR EMPLOYING FIXED-SIZE REMEMBERED SETS

(75) Inventor: Alexander T. Garthwaite, Beverly, MA (US)

(73) Assignee: Sun Microsystems, Inc., Palo Alto, CA (US)

(*) Notice: Under 35 U.S.C. 154(b), the term of this patent shall be extended for 0 days.

(21) Appl. No.: 09/377,555

(22) Filed: Aug. 19, 1999

(51) Int. Cl.[7] ................................................. G06F 17/30
(52) U.S. Cl. ................................. 707/206; 707/202
(58) Field of Search ........................... 707/206, 205, 707/100, 101, 102, 103, 104, 202

(56) References Cited

U.S. PATENT DOCUMENTS

| | | | | |
|---|---|---|---|---|
| 4,912,629 | * | 3/1990 | Shuler, Jr. ........................ | 707/206 |
| 5,845,298 | * | 12/1998 | O'Connor et al. ............... | 707/206 |
| 5,900,001 | * | 5/1999 | Wolczko et al. ................ | 707/206 |
| 5,903,900 | * | 5/1999 | Knippel .......................... | 707/206 |
| 5,953,736 | * | 9/1999 | O'Connor et al. ............... | 707/206 |

OTHER PUBLICATIONS

Paul R. Wilson, "Uniprocessor Garbage Collection Techniques", in Yves Bekkers and Jacques Cohen, editors, Proceedings of International Workshop on Memory Management, vol. 637 of Lecture Notes in Computer Science, 1992 Springer–Verlag.

Henry Lieberman and Carl Hewitt, "A Real–Time Garbage Collector Based On The Lifetimes of Objects", Communications of the ACM, 26(6), pp. 419–429, 1983.

David Ungar, "Generation Scavenging: A Non–Disruptive High Performance Storage Reclaration Algorithm", ACM Sigplan Notices 19(5): 157–167, Apr. 1984.

Andrew W. Appel, "Simple Generational Garbage Collection And Fast Allocation", Software Practice and Experience, 19(2): 171–183, 1989.

Richard Hudson and Amer Diwan, "Adaptive Garbage Collection For Modula–3 And Small Talk" in OPPSLA/ECOOP '90 Workshop on Garbage Collection in Object–Oriented Systems, Oct. 1990, edited by Eric Jul and Niels–Christian Juul.

(List continued on next page.)

Primary Examiner—Thomas G. Black
Assistant Examiner—Frantz Coby
(74) Attorney, Agent, or Firm—Cesari and McKenna, LLP

(57) ABSTRACT

A garbage collector collects a generation of a collected heap in accordance with the train algorithm. It employs remembered sets associated with respective car sections to keep track of references into the associated car sections. Each remembered set contains entries that identify respective regions in the generation that contain references into the associated car section. A limit is imposed on the number of entries in the remembered sets used to keep track of references to objects in certain car sections that contain only a single object each. An object in any such car section whose remembered set has more than a threshold number of entries is treated as reachable and relinked into a younger train without having the memory regions that those entries identify searched for valid references.

14 Claims, 28 Drawing Sheets

OTHER PUBLICATIONS

Richard L. Hudson, J. Eliot B. Moss, Amer Diwan and Christopher F. Weight, "A Language –Independent Garbage Collector Toolkit" Coins Technical Report, Sep. 1991.

Antony L. Hosking, J. Eliot B. Moss and Darko Stefanovic, "A Comparative Performance Evaluation of Write Barrier Implementation", in OOPSLA '92 ACM Conference on Object–Oriented Systems, Languages, and Applications, vol. 27(10) of ACM SIGPLAN Notices. Vancouver, BC, Oct. 1992, ACM Press.

Richardson L. Hudson and J. Eliot B. Moss, "Incremental-Collection of Mature Objects,", Proceedings of the International Workshop on Memory Management, 1992, Springer–Verlag.

Urs Holze, "A Fast Write Barrier For Generational Garbage Coolectors" in OOPSLA/ECOOP '93, edited by Moss, Wilson and Zorn.

Anthony L. Hosking and Richard L. Hudson, "Remembered Sets Can Also Play Cards" in OOPSLA/ECOOP '93 Workshop on Garbage Collection in Object–Oriented Systems, Oct. 1993, edited by Moss, Wilson and Zorn.

Jacob Seligmann and Steffen Grarup, "Incremental Mature Garbage Collection Using Train Algorithm", In The European Conference on Object–Oriented Programming 1995 Proceedings. Available at http://www.daimi.aau.dk/jacobse/Papers/.

Steffen Grarup and Jacob Seligmann, "Incremental Mature Garbage Collection" M.Sc.Thesis, avaliable at http://www-.daimi.aau.dk/jacobse/Papers/. Aug. 1993.

Azagury et al. "Combining Card Marking With Remembered Sets: How To Save Scanning Time", Proceedings of The First International Symposium on Memory Management, vol. 34(3) of ACM SIGPLAN Notices, Vancouver: ACM Press, Oct. 1998.

* cited by examiner

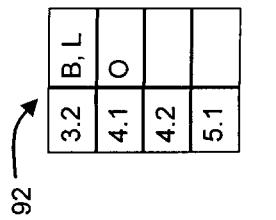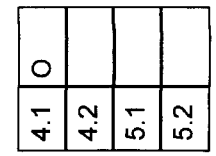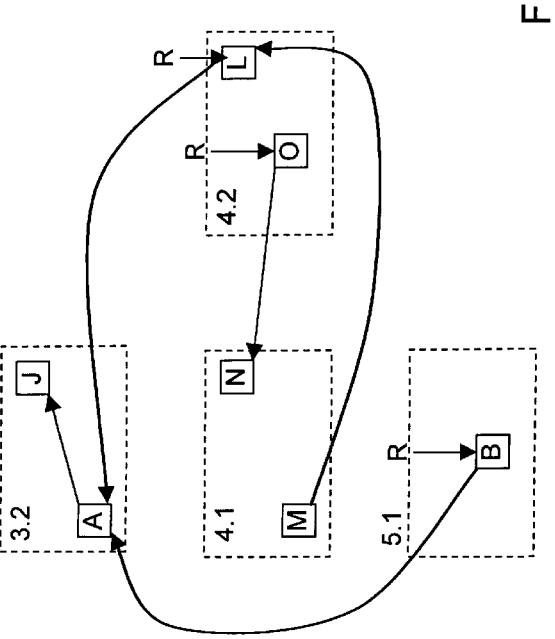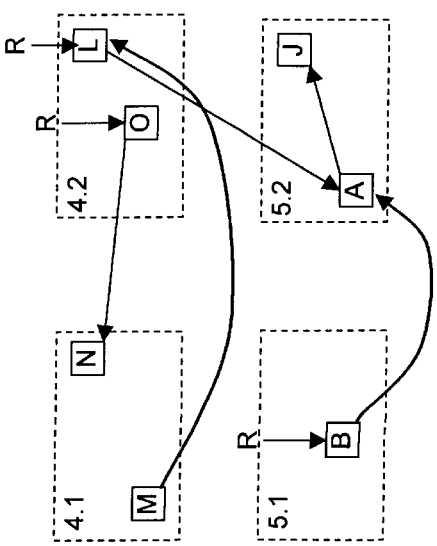
FIG. 8G
FIG. 8H

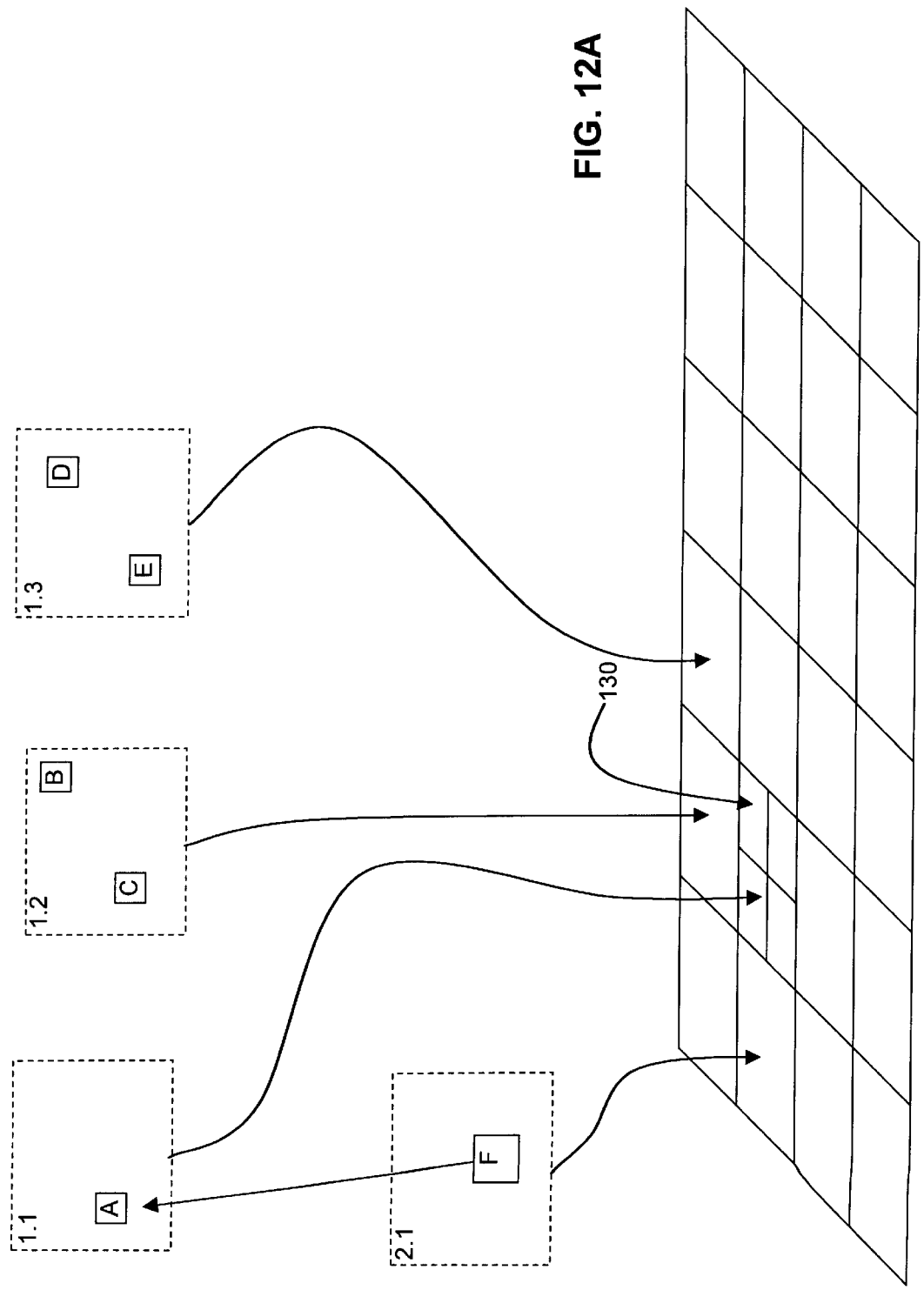

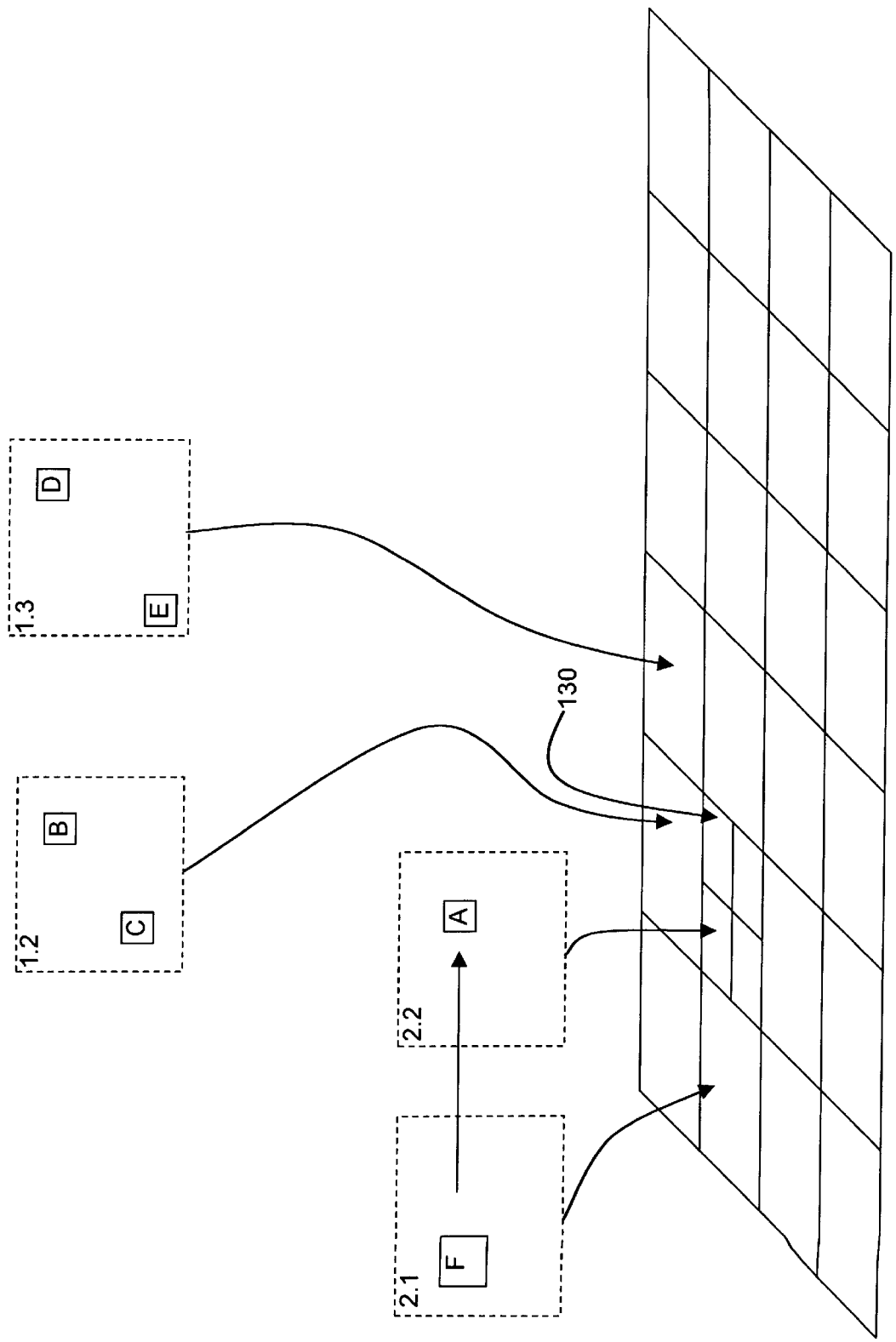

TRAIN-ALGORITHM-BASED GARBAGE COLLECTOR EMPLOYING FIXED-SIZE REMEMBERED SETS

CROSS-REFERENCE TO RELATED APPLICATIONS

This application is related to commonly assigned U.S. patent applications of Alexander T. Garthwaite for Popular-Object Handling in a Train-Algorithm-Based Garbage Collector, for Scalable-Remembered-Set Garbage Collection, and for a Train-Algorithm-Based Garbage Collector Employing Reduced Oversized-Object Threshold, and it is also related to commonly assigned U.S. patent applications of Garthwaite et al. for Reduced-Cost Remembered-Set Processing and for a Train-Algorithm-Based Garbage Collector Employing Farthest-Forward-Car Indicator, all of which are filed concurrently herewith and are hereby incorporated in their entirety by reference.

BACKGROUND OF THE INVENTION

The present invention is directed to memory management. It particularly concerns what has come to be known as "garbage collection."

In the field of computer systems, considerable effort has been expended on the task of allocating memory to data objects. For the purposes of this discussion, the term object refers to a data structure represented in a computer system's memory. Other terms sometimes used for the same concept are record and structure. An object may be identified by a reference, a relatively small amount of information that can be used to access the object. A reference can be represented as a "pointer" or a "machine address," which may require, for instance, only sixteen, thirty-two, or sixty-four bits of information, although there are other ways to represent a reference.

In some systems, which are usually known as "object oriented," objects may have associated methods, which are routines that can be invoked by reference to the object. They also may belong to a class, which is an organizational entity that may contain method code or other information shared by all objects belonging to that class. In the discussion that follows, though, the term object will not be limited to such structures; it will additionally include structures with which methods and classes are not associated.

The invention to be described below is applicable to systems that allocate memory to objects dynamically. Not all systems employ dynamic allocation. In some computer languages, source programs can be so written that all objects to which the program's variables refer are bound to storage locations at compile time. This storage-allocation approach, sometimes referred to as "static allocation," is the policy traditionally used by the Fortran programming language, for example.

Even for compilers that are thought of as allocating objects only statically, of course, there is often a certain level of abstraction to this binding of objects to storage locations. Consider the typical computer system 10 depicted in FIG. 1, for example. Data, and instructions for operating on them, that a microprocessor 11 uses may reside in on-board cache memory or be received from further cache memory 12, possibly through the mediation of a cache controller 13. That controller 13 can in turn receive such data from system read/write memory ("RAM") 14 through a RAM controller 15 or from various peripheral devices through a system bus 16. The memory space made available to an application program may be "virtual" in the sense that it may actually be considerably larger than RAM 14 provides. So the RAM contents will be swapped to and from a system disk 17.

Additionally, the actual physical operations performed to access some of the most-recently visited parts of the process's address space often will actually be performed in the cache 12 or in a cache on board microprocessor 11 rather than on the RAM 14, with which those caches swap data and instructions just as RAM 14 and system disk 17 do with each other.

A further level of abstraction results from the fact that an application will often be run as one of many processes operating concurrently with the support of an underlying operating system. As part of that system's memory management, the application's memory space may be moved among different actual physical locations many times in order to allow different processes to employ shared physical memory devices. That is, the location specified in the application's machine code may actually result in different physical locations at different times because the operating system adds different offsets to the machine-language-specified location.

Despite these expedients, the use of static memory allocation in writing certain long-lived applications makes it difficult to restrict storage requirements to the available memory space. Abiding by space limitations is easier when the platform provides for dynamic memory allocation, i.e., when memory space to be allocated to a given object is determined only at run time.

Dynamic allocation has a number of advantages, among which is that the run-time system is able to adapt allocation to run-time conditions. For example, the programmer can specify that space should be allocated for a given object only in response to a particular run-time condition. The C-language library function malloc() is often used for this purpose. Conversely, the programmer can specify conditions under which memory previously allocated to a given object can be reclaimed for reuse. The C-language library function free() results in such memory reclamation.

Because dynamic allocation provides for memory reuse, it facilitates generation of large or long-lived applications, which over the course of their lifetimes may employ objects whose total memory requirements would greatly exceed the available memory resources if they were bound to memory locations statically.

Particularly for long-lived applications, though, allocation and reclamation of dynamic memory must be performed carefully. If the application fails to reclaim unused memory—or, worse, loses track of the address of a dynamically allocated segment of memory—its memory requirements will grow over time to exceed the system's available memory. This kind of error is known as a "memory leak."

Another kind of error occurs when an application reclaims memory for reuse even though it still maintains a reference to that memory. If the reclaimed memory is reallocated for a different purpose, the application may inadvertently manipulate the same memory in multiple inconsistent ways. This kind of error is known as a "dangling reference," because an application should not retain a reference to a memory location once that location is reclaimed. Explicit dynamic-memory management by using interfaces like malloc()/free() often leads to these problems.

A way of reducing the likelihood of such leaks and related errors is to provide memory-space reclamation in a more-automatic manner. Techniques used by systems that reclaim memory space automatically are commonly referred to as "garbage collection."Garbage collectors operate by reclaiming space that they no longer consider "reachable." Statically allocated objects represented by a program's global variables are normally considered reachable throughout a program's life. Such objects are not ordinarily stored in the garbage collector's managed memory space, but they may contain references to dynamically allocated objects that are, and such objects are considered reachable. Clearly, an object referred to in the processor's call stack is reachable, as is an object referred to by register contents. And an object referred to by any reachable object is also reachable.

The use of garbage collectors is advantageous because, whereas a programmer working on a particular sequence of code can perform his task creditably in most respects with only local knowledge of the application at any given time, memory allocation and reclamation require a global knowledge of the program. Specifically, a programmer dealing with a given sequence of code does tend to know whether some portion of memory is still in use for that sequence of code, but it is considerably more difficult for him to know what the rest of the application is doing with that memory. By tracing references from some conservative notion of a "root set," e.g., global variables, registers, and the call stack, automatic garbage collectors obtain global knowledge in a methodical way. By using a garbage collector, the programmer is relieved of the need to worry about the application's global state and can concentrate on local-state issues, which are more manageable. The result is applications that are more robust, having no dangling references and fewer memory leaks.

Garbage-collection mechanisms can be implemented by various parts and levels of a computing system. One approach is simply to provide them as part of a batch compiler's output. Consider FIG. 2's simple batch-compiler operation, for example. A computer system executes in accordance with compiler object code and therefore acts as a compiler 20. The compiler object code is typically stored on a medium such as FIG. 1's system disk 17 or some other machine-readable medium, and it is loaded into RAM 14 to configure the computer system to act as a compiler. In some cases, though, the compiler object code's persistent storage may instead be provided in a server system remote from the machine that performs the compiling. The electrical signals that carry the digital data by which the computer systems exchange that code are exemplary forms of carrier waves transporting the information.

The input to the compiler is the application source code, and the end product of the compiler process is application object code. This object code defines an application 21, which typically operates on input such as mouse clicks, etc., to generate a display or some other type of output. This object code implements the relationship that the programmer intends to specify by his application source code. In one approach to garbage collection, the compiler 20, without the programmer's explicit direction, additionally generates code that automatically reclaims unreachable memory space.

Even in this simple case, though, there is a sense in which the application does not itself provide the entire garbage collector. Specifically, the application will typically call upon the underlying operating system's memory-allocation functions. And the operating system may in turn take advantage of various hardware that lends itself particularly to use in garbage collection. So even a very simple system may disperse the garbage-collection mechanism over a number of computer-system layers.

To get some sense of the variety of system components that can be used to implement garbage collection, consider FIG. 3's example of a more complex way in which various levels of source code can result in the machine instructions that a processor executes. In the FIG. 3 arrangement, the human applications programmer produces source code 22 written in a high-level language. A compiler 23 typically converts that code into "class files." These files include routines written in instructions, called "byte codes" 24, for a "virtual machine" that various processors can be configured to emulate. This conversion into byte codes is almost always separated in time from those codes' execution, so FIG. 3 divides the sequence into a "compile-time environment" 25 separate from a "run-time environment" 26, in which execution occurs. One example of a high-level language for which compilers are available to produce such virtual-machine instructions is the Java™ programming language. (Java is a trademark or registered trademark of Sun Microsystems, Inc., in the Unites States and other countries.)

Most typically, the class files' byte-code routines are executed by a processor under control of a virtual-machine process 27. That process emulates a virtual machine from whose instruction set the byte codes are drawn. As is true of the compiler 23, the virtual-machine process 27 may be specified by code stored on a local disk or some other machine-readable medium from which it is read into FIG. 1's RAM 14 to configure the computer system to act as a virtual machine and implement the garbage collector. Again, though, that code's persistent storage may instead be provided by a server system remote from the processor that implements the virtual machine, in which case the code would be transmitted electrically or optically to the virtual-machine-implementing processor.

In most implementations, much of the virtual machine's action in executing these byte codes is most like what those skilled in the art refer to as "interpreting," and FIG. 3 shows that the virtual machine includes an "interpreter" 28 for that purpose. The resultant instructions typically invoke calls to a run-time system 29, which handles matters such as loading new class files as they are needed and, of particular interest in the present connection, performing garbage collection.

In addition to running an interpreter, many virtual-machine implementations also actually compile the byte codes concurrently with the resultant object code's execution, so FIG. 3 depicts the virtual machine as additionally including a "just-in-time" compiler 30.

The arrangement of FIG. 3 differs from FIG. 2 in that the compiler 23 for converting the human programmer's code does not contribute to providing the garbage-collection function; that results largely from the virtual machine 27's operation. Although the FIG. 3 arrangement is a popular one, it is by no means universal, and many further implementation types can be expected. Proposals have even been made to implement the virtual machine 27's behavior in a hardware processor, in which case the hardware itself would provide some or all of the garbage-collection function.

In short, garbage collectors can be implemented in a wide range of combinations of hardware and/or software. As is true of most of the garbage-collection techniques described in the literature, the invention to be described below is applicable to most such systems.

By implementing garbage collection, a computer system can greatly reduce the occurrence of memory leaks and other software deficiencies in which human programming frequently results. But it can also have significant adverse performance effects if it is not implemented carefully. To distinguish the part of the program that does "useful" work from that which does the garbage collection, the term mutator is sometimes used in discussions of these effects; from the collector's point of view, what the mutator does is mutate active data structures' connectivity.

Some garbage-collection approaches rely heavily on interleaving garbage-collection steps among mutator steps. In one type of garbage-collection approach, for instance, the mutator operation of writing a reference is followed immediately by garbage-collector steps used to maintain a reference count in that object's header, and code for subsequent new-object storage includes steps for finding space occupied by objects whose reference count has fallen to zero. Obviously, such an approach can slow mutator operation significantly.

Other approaches therefore interleave very few garbage-collector-related instructions into the main mutator process but instead interrupt it from time to time to perform garbage-collection cycles, in which the garbage collector finds unreachable objects and reclaims their memory space for reuse. Such an approach will be assumed in discussing FIG. 4's depiction of a simple garbage-collection operation. Within the memory space allocated to a given application is a part 40 managed by automatic garbage collection. In the following discussion, this will be referred to as the "heap," although in other contexts that term refers to all dynamically allocated memory. During the course of the application's execution, space is allocated for various objects 42, 44, 46, 48, and 50. Typically, the mutator allocates space within the heap by invoking the garbage collector, which at some level manages access to the heap. Basically, the mutator asks the garbage collector for a pointer to a heap region where it can safely place the object's data. The garbage collector keeps track of the fact that the thus-allocated region is occupied. It will refrain from allocating that region in response to any other request until it determines that the mutator no longer needs the region allocated to that object.

Garbage collectors vary as to which objects they consider reachable and unreachable. For the present discussion, though, an object will be considered "reachable" if it is referred to as object 42 is, by a reference in the root set 52. The root set consists of reference values stored in the mutator's threads' call stacks, the CPU registers, and global variables outside the garbage-collected heap. An object is also reachable if it is referred to, as object 46 is, by another reachable object (in this case, object 42). Objects that are not reachable can no longer affect the program, so it is safe to re-allocate the memory spaces that they occupy.

A typical approach to garbage collection is therefore to identify all reachable objects and reclaim any previously allocated memory that the reachable objects do not occupy. A typical garbage collector may identify reachable objects by tracing references from the root set 52. For the sake of simplicity, FIG. 4 depicts only one reference from the root set 52 into the heap 40. (Those skilled in the art will recognize that there are many ways to identify references, or at least data contents that may be references.) The collector notes that the root set points to object 42, which is therefore reachable, and that reachable object 42 points to object 46, which therefore is also reachable. But those reachable objects point to no other objects, so objects 44, 48, and 50 are all unreachable, and their memory space may be reclaimed.

To avoid excessive heap fragmentation, some garbage collectors additionally relocate reachable objects. FIG. 5 shows a typical approach. The heap is partitioned into two halves, hereafter called "semi-spaces." For one garbage-collection cycle, all objects are allocated in one semi-space 54, leaving the other semi-space 56 free. When the garbage-collection cycle occurs, objects identified as reachable are "evacuated" to the other semi-space 56, so all of semi-space 54 is then considered free. Once the garbage-collection cycle has occurred, all new objects are allocated in the lower semi-space 56 until yet another garbage-collection cycle occurs, at which time the reachable objects are evacuated back to the upper semi-space 54.

Although this relocation requires the extra steps of copying the reachable objects and updating references to them, it tends to be quite efficient, since most new objects quickly become unreachable, so most of the current semi-space is actually garbage. That is, only a relatively few, reachable objects need to be relocated, after which the entire semi-space contains only garbage and can be pronounced free for reallocation.

In one sense, the approach of interrupting the mutator occasionally for garbage collection can increase an application's responsiveness, because the main mutator operation ordinarily proceeds relatively unburdened by garbage-collection overhead. In interactive systems, moreover, interruptions for garbage collection can sometimes be scheduled opportunistically so as to reduce the likelihood that they will result in much overall speed reduction. Garbage collection can be triggered when the system is waiting for user input, for instance.

So it may often be true that the garbage-collection operation's effect on performance can depend less on the total collection time than on when collections actually occur. But another factor that often is even more determinative is the duration of any single collection cycle, i.e., how long the mutator must remain quiescent at any one time. In an interactive system, for instance, a user may never notice hundred-millisecond interruptions for garbage collection, whereas most users would find interruptions lasting for two seconds to be annoying. Many garbage collectors therefore operate incrementally. That is, they perform less than a complete collection in any single interruption of the main application.

A way of not only reducing collection-cycle length but also increasing overall efficiency is to segregate the heap into one or more parts, called generations, that are subject to different collection policies. New objects are allocated in a "young" generation, and older objects are promoted from younger generations to older or more "mature" generations. Collecting the younger generations more frequently than the others yields greater efficiency because the younger generations tend to accumulate garbage faster; newly allocated objects tend to "die," while older objects tend to "survive."

But generational collection greatly increases what is effectively the root set for a given generation. Consider FIG. 6, which depicts a heap as organized into three generations 58, 60, and 62. Assume that generation 60 is to be collected. The process for this individual generation may be more or less the same as that described in connection with FIGS. 4 and 5 for the entire heap, with one major exception. In the case of a single generation, the root set must be considered to include not only the call stack, registers, and global variables represented by set 52 but also objects in the other generations 58 and 62, which themselves may contain references to objects in generation 60. So pointers must be traced not only from the basic root set 52 but also from objects within the other generations.

One could perform this tracing by simply inspecting all references in all other generations at the beginning of every collection cycle, and it turns out that this approach is actually feasible in some situations. But it takes too long in other situations, so workers in this field have employed a number of approaches to expediting reference tracing. One approach is to include so-called write barriers in the mutator process. A write barrier is code added to a write operation to record information from which the collector can determine where references were or may have been written since the last collection cycle. A reference list can then be maintained by taking such a list as it existed at the end of the previous collection cycle and updating it by inspecting only locations identified by the write barrier as possibly modified since the last collection cycle.

One of the many such implementations commonly used by workers in this art employs what has been referred to as the "card table." FIG. 6 depicts the various generations as being divided into smaller sections, known for this purpose as "cards." Card tables 64, 66, and 68 associated with respective generations contain an entry for each of their cards. Each card-table entry includes some summary of its associated card's intergenerational-reference content. This summary may be no more than a binary indication of whether such a reference exists, but it preferably includes a list of offsets that indicate such references' locations in the card. Part of entry 69, for instance, may be an offset that indicates the location of an inter-generational reference 70 within the corresponding card 72. For the sake of concreteness, we will assume that the summaries are maintained by steps that occur principally at the beginning of each collection cycle.

Of course, the card-table approach is only one of many that can be employed to detect inter-generational pointers. Indeed, it is typical for an individual garbage collector to use more than one approach. Although there is no reason in principle to favor any particular number of generations, and although FIG. 6 shows three, most generational garbage collectors have only two generations, of which one is the young generation and the other is the mature generation. Moreover, although FIG. 6 shows the generations as being of the same size, a more-typical configuration is for the young generation to be considerably smaller. Finally, although we assumed for the sake of simplicity that collection during a given cycle was limited to only one generation, a more-typical approach is actually to collect the whole young generation at every cycle but to collect the mature one less frequently.

To collect the young generation, it is preferable to employ the card table to identify pointers into the young generation; laboriously scanning the entire mature generation would take too long. On the other hand, since the young generation is collected in every cycle and can therefore be collected before mature-generation processing, it takes little time to scan the few remaining, live objects in the young generation for pointers into the mature generation in order to process that generation. For this reason, the card table will typically be so maintained as only to identify the regions occupied by references into younger generations and not into older ones.

Now, although it typically takes very little time to collect the young generation, it may take more time than is acceptable within a single garbage-collection cycle to collect the entire mature generation. So some garbage collectors may collect the mature generation incrementally; that is, they may perform only a part of the mature generation's collection during any particular collection cycle. Incremental collection presents the problem that, since the generation's objects that are outside a collection cycle's collection set are not processed during that cycle, any such objects that are unreachable are not recognized as unreachable, so collection-set objects to which they refer tend not to be, either.

To reduce the adverse effect this would otherwise have on collection efficiency, workers in this field have employed the "train algorithm," which FIG. 7 depicts. A generation to be collected incrementally is divided into sections, which for reasons about to be described are referred to as "car sections." The generation may be collected incrementally in fixed-size sections, in which case the size may equal that of the generation portion to be collected during one cycle. More typically, the fraction of the generation to be collected during any one cycle varies with run-time conditions, in which case the car-section size is often that of the minimum fraction to be collected in one cycle, although that is not a requirement.

The discussion that follows will occasionally follow the nomenclature in the literature by using the term car instead of car section. But the literature seems to use that term to refer variously not only to memory sections themselves but also to data structures that the train algorithm employs to manage them when they contain objects, as well as to the more-abstract concept that the car section and managing data structure represent in discussions of the algorithm. So the following discussion will more frequently use the expression car section to emphasize the actual sections of memory space for whose management the car concept is employed.

Additionally, the car sections are grouped into "trains," which are ordered according to age. For example, FIG. 7 shows an oldest train 73 consisting of a generation 74's three car sections described by associated data structures 75, 76, and 78, while a second train 80 consists only of a single car section, represented by structure 82, and the youngest train 84 (referred to as the "allocation train") consists of car sections that data structures 86 and 88 represent. As will be seen below, car sections' train memberships can change, and any car section added to a train is added to the end of a train. Train size is a matter of design choice, but its purpose is to maximize the probability that garbage reference "cycles" can be reclaimed, as will now be explained.

Although more than one car section may be collected in any given cycle, little generality is lost by considering the situation in which only a single car is collected during any cycle. The car collected in any cycle is the one added least recently to the oldest train, which in this case is car 75. All of the generation's cars can thus be thought of as waiting for collection in a single long line, in which cars in a given train are farther forward than those in any younger train, and those added to a train more recently are behind those added to it earlier.

As is usual, the way in which reachable objects are identified is to determine whether there are references to them in the root set or in any other object already determined to be reachable. In accordance with the train algorithm, the collector additionally performs a test to determine whether there are any references at all from outside the oldest train to objects within it. If there are not, then all cars within the train can be reclaimed, even though not all of those cars are in the collection set. And the train algorithm so operates that inter-car references tend to be grouped into trains, as will now be explained.

To identify references into the car from outside of it, train-algorithm implementations typically employ "remembered sets." As card tables are, remembered sets are used to keep track of references. Whereas a card-table entry contains information about references that the associated card contains, though, a remembered set associated with a given region contains information about references into that region from locations outside of it. In the case of the train algorithm, remembered sets are associated with car sections. Each remembered set, such as car 75's remembered set 90, lists locations in the generation that contain references into the associated car section. The remembered sets for all of a generation's cars are typically updated at the start of each collection cycle, concurrently with card-table updates. For reasons that will become apparent, the collector will typically not bother to place in the remembered set the locations of references from objects in car sections farther forward in the collection queue, i.e., from objects in older trains or cars added earlier to the same train. For the sake of simplicity, we will continue the assumption that only a single car is collected during each collection cycle, although we will discuss multiple-car collection sets presently.

When the remembered sets have been updated, the collector reads the remembered set of each car in the collection set to determine the location of each reference from a higher-order car into the collection set. The collector places the address of each reference thereby found into a scratch-pad list associated with the train that contains that reference. (Again, the remembered set lists only reference locations in the same generation).

When the collector has read all references in the remembered set, it evacuates into the youngest train the collection-set-car objects referred to by the references in the locations that the youngest train's scratch-pad-list entries specify. It also removes those scratch-pad-list entries and updates the references to which they pointed so that those references reflect the evacuated objects' new locations. Any collection-set objects to which the thus-evacuated objects refer are similarly evacuated to that train, and this continues until that train no longer contains any references into the collection-set car section.

Whenever an object is evacuated, the collector leaves an indication of this fact in the object's previous location, together with the address of its new location. So, if the reference found in the location identified by any subsequent scratch-pad-list entry refers to an already-evacuated object, the collector is apprised of this fact and can update the reference without attempting to evacuate the already-evacuated object.

This process is repeated for successively older trains until the collector reaches the oldest train. Before it processes references in that train's scratch-pad list, the collector evacuates any objects referred to from outside the generation. To identify such objects, the collector scans the root set and other generations for references into the collection set. Now, it may not be necessary to scan all other generations. A particularly common scheme is not to collect any generation in a collection cycle in which every younger generation is not completely collected, and the policy may be to promote all surviving younger-generation objects into older generations. In such a situation, it is necessary only to scan older generations.

The scanning may actually involve inspecting each surviving object in the other generation, or the collector may expedite the process by using card-table entries. Regardless of which approach it uses, the collector immediately evacuates into another train any collection-set object to which it thereby finds an external reference. The typical policy is to place the evacuated object into the youngest such train. As before, the collector does not attempt to evacuate an object that has already been evacuated, and, when it does evacuate an object to a train, it evacuates to the same train any objects in the collection-set car to which the thus-evacuated object refers. In any case, the collector updates the reference to the evacuated object.

When all inter-generationally referred-to objects have been evacuated from the collection-set car, the collector proceeds to evacuate any collection-set objects referred to by references whose locations the oldest train's scratch-pad list includes. It removes them to younger cars in the oldest train, again updating references, avoiding duplicate evacuations, and evacuating any collection-set-car objects to which the evacuated objects refer. When this process has been completed, the car section can be reclaimed, since any reference to any remaining object must reside in the same car, so all remaining collection-set objects are unreachable.

When the collection-set car section has been reclaimed, the garbage collector then performs the train algorithm's central test: it determines whether there are any references into the oldest train from outside that train. If not, the entire train can be reclaimed, even if there are inter-car references between its individual cars. By evacuating objects into the trains that references to them occupy, the train algorithm tends to group garbage reference cycles into single trains, whose sizes are not limited, as car sizes are, by the need to optimize collection-cycle duration. The train algorithm is thus able to reclaim space occupied by large garbage reference cycles even if the space increments (car sections) that it collects are relatively small. To support this process, a tally of how many references there are from other trains in the same generation is typically maintained in connection with the various remembered-set updates. This tally, together with a tally of extra-generational references developed during the extra-generational scan, yields the indications of whether there are any references into a given train from outside that train.

FIGS. 8A–8J illustrate results of using the train algorithm. FIG. 8A represents a generation in which objects have been allocated in nine car sections. The oldest train has four cars, numbered 1.1 through 1.4. Car 1.1 has two objects, A and B. There is a reference to object B in the root set (which, as was explained above, includes live objects in the other generations). Object A is referred to by object L, which is in the third train's sole car section. In the generation's remembered sets 92, a reference in object L has therefore been recorded against car 1.1.

Processing always starts with the oldest train's earliest-added car, so the garbage collector refers to car 1.1's remembered set and finds that there is a reference from object L into the car being processed. It accordingly evacuates object A to the train that object L occupies. The object being evacuated is often placed in one of the selected train's existing cars, but we will assume for present purposes that there is not enough room. So the garbage collector evacuates object A into a new car section and updates appropriate data structures to identify it as the next car in the third train. FIG. 8B depicts the result: a new car has been added to the third train, and object A is placed in it.

FIG. 8B also shows that object B has been evacuated to a new car outside the first train. This is because object B has an external reference, which, like the reference to object A, is a reference from outside the first train, and one goal of the processing is to form trains into which there are no further references. Note that, to maintain a reference to the same object, object L's reference to object A has had to be rewritten, and so have object B's reference to object A and the inter-generational pointer to object B. In the illustrated example, the garbage collector begins a new train for the car into which object B is evacuated, but this is not a necessary requirement of the train algorithm. That algorithm requires only that externally referenced objects be evacuated to a newer train.

Since car 1.1 no longer contains live objects, it can be reclaimed, as FIG. 8B also indicates. Also note that the remembered set for car 2.1 now includes the address of a reference in object A, whereas it did not before. As was stated before, remembered sets in the illustrated embodiment include only references from cars further back in the order than the one with which the remembered set is associated. The reason for this is that any other cars will already be reclaimed by the time the car associated with that remembered set is processed, so there is no reason to keep track of references from them.

The next step is to process the next car, the one whose index is 1.2. The purpose of a generation's division into car sections is to provide for incremental collection, so collection of car 1.2 can wait until the collection cycle following the one during which car 1.1 is collected. Indeed, the garbage collector can postpone its processing for several collection cycles (during which presumably only younger generations are collected). As was mentioned above, we will assume in this scenario that each car's collection occurs in its own separate collection cycle. And for the sake of simplicity we will assume that the mutator does not change any references into the generation in the interim.

FIG. 8B depicts car 1.2 as containing only a single object, object C, and that car's remembered set contains the address of an inter-car reference from object F. The garbage collector follows that reference to object C. Since this identifies object C as possibly reachable, the garbage collector evacuates it from car set 1.2, which is to be reclaimed. Specifically, the garbage collector removes object C to a new car section, section 1.5, which is linked to the train to which the referring object F's car belongs. Of course, object F's reference needs to be updated to object C's new location. FIG. 8C depicts the evacuation's result.

FIG. 8C also indicates that car set 1.2 has been reclaimed, and car 1.3 is next to be processed. The only address in car 1.3's remembered set is that of a reference in object G. Inspection of that reference reveals that it refers to object F. Object F may therefore be reachable, so it must be evacuated before car section 1.3 is reclaimed. On the other hand, there are no references to objects D and E, so they are clearly garbage. FIG. 8D depicts the result of reclaiming car 1.3's space after evacuating possibly reachable object F.

In the state that FIG. 8D depicts, car 1.4 is next to be processed, and its remembered set contains the addresses of references in objects K and C. Inspection of object K's reference reveals that it refers to object H, so object H must be evacuated. Inspection of the other remembered-set entry, the reference in object C, reveals that it refers to object G, so that object is evacuated, too. As FIG. 8E illustrates, object H must be added to the second train, to which its referring object K belongs. In this case there is room enough in car 2.2, which its referring object K occupies, so evacuation of object H does not require that object K's reference to object H be added to car 2.2's remembered set. Object G is evacuated to a new car in the same train, since that train is where referring object C resides. And the address of the reference in object G to object C is added to car 1.5's remembered set.

FIG. 8E shows that this processing has eliminated all references into the first train, and it is an important part of the train algorithm to test for this condition. That is, even though there are references into both of the train's cars, those cars' contents can be recognized as all garbage because there are no references into the train from outside of it. So all of the first train's cars are reclaimed.

The collector accordingly processes car 2.1 during the next collection cycle, and that car's remembered set indicates that there are two references outside the car that refer to objects within it. Those references are in object K, which is in the same train, and object A, which is not. Inspection of those references reveals that they refer to objects I and J, which are evacuated.

The result, depicted in FIG. 8F, is that the remembered sets for the cars in the second train reveal no inter-car references, and there are no inter-generational references into it, either. That train's car sections therefore contain only garbage, and their memory space can be reclaimed.

So car 3.1 is processed next. Its sole object, object L, is referred to inter-generationally as well as by a reference in the fourth train's object M. As FIG. 8G shows, object L is therefore evacuated to the fourth train. And the address of the reference in object L to object A is placed in the remembered set associated with car 3.2, in which object A resides.

The next car to be processed is car 3.2, whose remembered set includes the addresses of references into it from objects B and L. Inspection of the reference from object B reveals that it refers to object A, which must therefore be evacuated to the fifth train before car 3.2 can be reclaimed. Also, we assume that object A cannot fit in car section 5.1, so a new car 5.2 is added to that train, as FIG. 8H shows, and object A is placed in its car section. All referred-to objects in the third train having been evacuated, that (single-car) train can be reclaimed in its entirety.

A further observation needs to be made before we leave FIG. 8G. Car 3.2's remembered set additionally lists a reference in object L, so the garbage collector inspects that reference and finds that it points to the location previously occupied by object A. This brings up a feature of copying-collection techniques such as the typical train-algorithm implementation. When the garbage collector evacuates an object from a car section, it marks the location as having been evacuated and leaves the address of the object's new location. So when the garbage collector traces the reference from object L, it finds that object A has been removed, and it accordingly copies the new location into object L as the new value of its reference to object A.

In the state that FIG. 8H illustrates, car 4.1 is the next to be processed. Inspection of the fourth train's remembered sets reveals no inter-train references into it, but the inter-generational scan (possibly performed with the aid of FIG. 6's card tables) reveals inter-generational references into car 4.2. So the fourth train cannot be reclaimed yet. The garbage collector accordingly evacuates car 4.1's referred-to objects in the normal manner, with the result that FIG. 8I depicts.

In that state, the next car to be processed has only inter-generational references into it. So, although its referred-to objects must therefore be evacuated from the train, they can be placed in any other train. In the illustrated implementation, a new train is formed for this purpose, so the result of car 4.2's processing is the state that FIG. 8J depicts.

Processing continues in this same fashion. Of course, subsequent collection cycles will not in general proceed, as in the illustrated cycles, without any reference changes by the mutator and without any addition of further objects. But reflection reveals that the general approach just described still applies when such mutations occur.

However, there is a simplification in the foregoing scenario that does obscure a difficulty encountered in implementing the train algorithm. FIG. 8F shows that there are two references to object L after the second train is collected. So references in both of the referring objects need to be updated when object L is evacuated. This is not a great burden, since only two referring objects are involved, but some types of applications routinely generate objects that are very "popular," i.e., are objects to which there are large numbers of references. Evacuating a single one of these objects therefore requires considerable reference updating.

If the object remains popular, moreover, the number of entries that must thereafter be made to its car's remembered set during later collection cycles will also be high. This causes such remembered sets to become large and unwieldy. In the worst case, such an object can be referred to by almost every object in the generation, in which case the remembered set would be on the order of the entire generation's size. This not only causes a significant space problem but also makes maintaining and processing remembered sets costly. As a remembered set's size increases, the cost of adding new entries, eliminating duplicate entries for the same references, and scanning the references during the car's collection can become unacceptable. The garbage-collection overhead thereby imposed by popular-object-using applications may be so great as to make it impractical to provide garbage-collection intervals that are short enough to meet performance requirements.

One proposal for dealing with popular objects involves marking such objects' cars as popular and simply exempting those cars from collection, on the theory that popular objects rarely become unreachable. This eliminates the need to maintain remembered sets for those cars, so there are no oversized remembered sets. But one can readily conceive of pathological cases in which large numbers of cars contain such objects that have in fact died. The heap could become largely useless in such cases.

Another approach is to take advantage of certain features of object-oriented languages. It may be determined from experience that the few objects that become popular are all instances of a small number of classes. So objects that are instances of those classes can be allocated in a special heap not managed in accordance with the train algorithm. That, too, eliminates the remembered-set problem that they would otherwise present. But the classes whose instances tend to be popular are different for different kinds of applications, and obtaining such knowledge for different applications would be impractical.

SUMMARY OF THE INVENTION

The present invention reduces the remembered-set burden that popular objects can impose, but it does so without exempting such objects from collection after they are no longer popular. Certain remembered sets, typically those for car sections that contain popular objects, are allocated only a fixed amount of memory. Also, and the associated car section is restricted to a single object. When the collector is in the process of updating the remembered sets and encounters a reference into the associate car section, it adds an additional entry to the remembered set only if doing so would not make the space allocated to it too full.

BRIEF DESCRIPTION OF THE DRAWINGS

The invention description below refers to the accompanying drawings, of which:

FIGS. 8A–J are diagrams illustrating a collection scenario that can result from use of the train algorithm;

FIGS. 12A and 12B are diagrams similar to FIGS. 11A and 11B but instead showing re-linking rather than reclamation of popular-object cars;

DETAILED DESCRIPTION OF AN ILLUSTRATIVE EMBODIMENT

Figure 9:
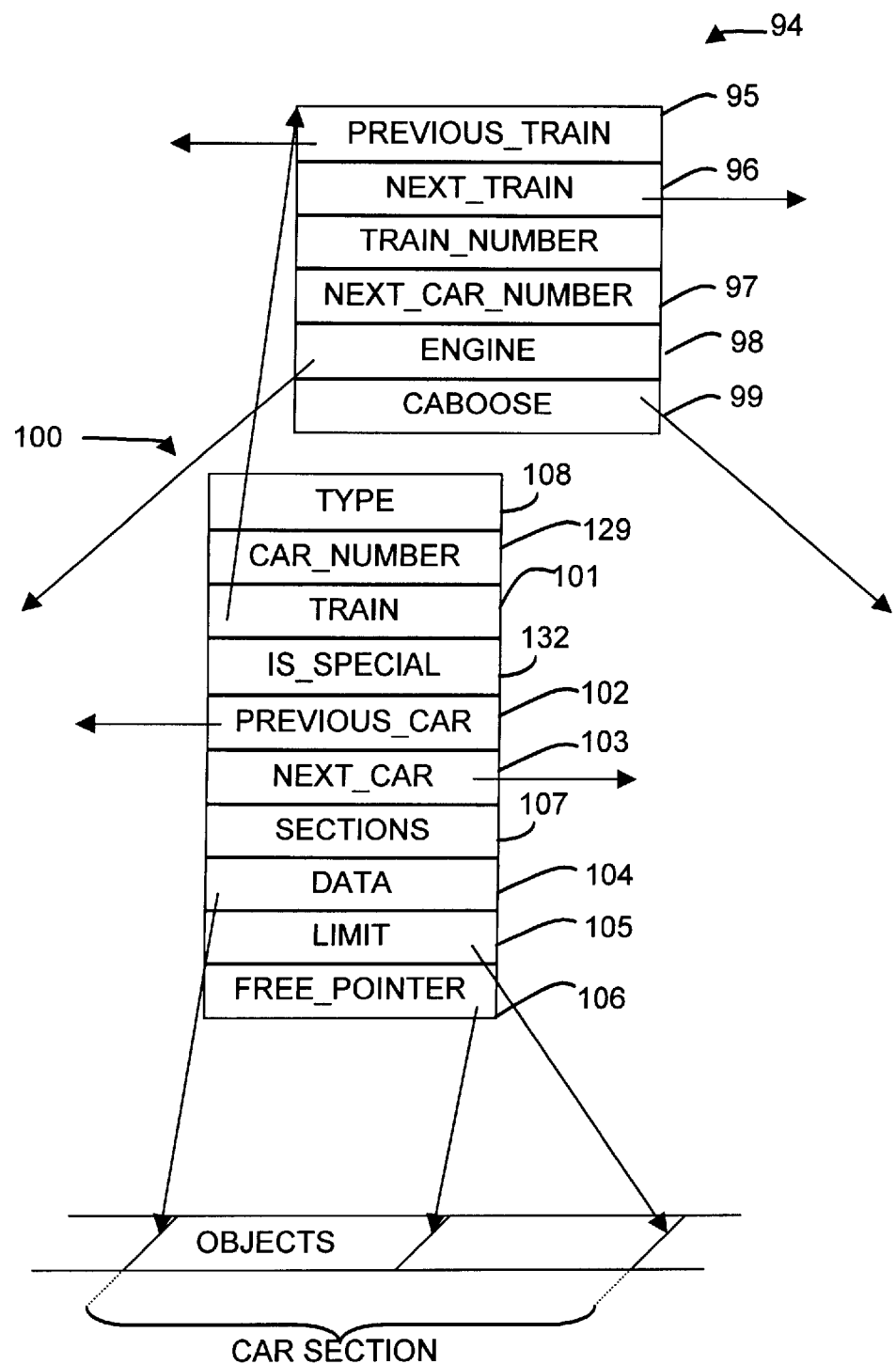
FIG. 9 is a diagram that illustrates train and car data structures that may be used in support of the train algorithm.

The illustrated embodiment eliminates much of the popular-object overhead by placing popular objects in their own cars. To understand how this can be done, consider FIG. 9's exemplary data structures, which represent the type of information a collector may maintain in support of the train algorithm. To emphasize the ordered nature of the trains, FIG. 9 depicts such a structure 94 as including pointers 95 and 96 to the previous and next trains, although train order could obviously be maintained without such a mechanism. Cars are ordered within trains, too, and it may be a convenient to assign numbers for this purpose explicitly and keep the next number to be assigned in the train-associated structure, as field 97 suggests. In any event, some way of associating cars with trains is necessary, and the drawing represents this by fields 98 and 99 that point to structures containing data for the train's first and last cars.

One such structure 100 is depicted as including pointers 101, 102, and 103 to structures that contain information concerning the train to which the car belongs, the previous car in the train, and the next car in the train. Further pointers 104 and 105 point to the locations in the heap at which the associated car section begins and ends, whereas pointer 106 points to the place at which the next object can be added to the car section.

As will be explained in more detail presently, there is a standard car-section size used for all cars that contain more than one object, and that size is great enough to contain a relatively large number of average-sized objects. But some objects can be too big for the standard size, so a car section may consist of more than one of the standard-size memory sections. Structure 100 therefore includes a field 107 that indicates how many standard-size memory sections there are in the car section that the structure manages—if the structure manages only a single car.

Figure 10:
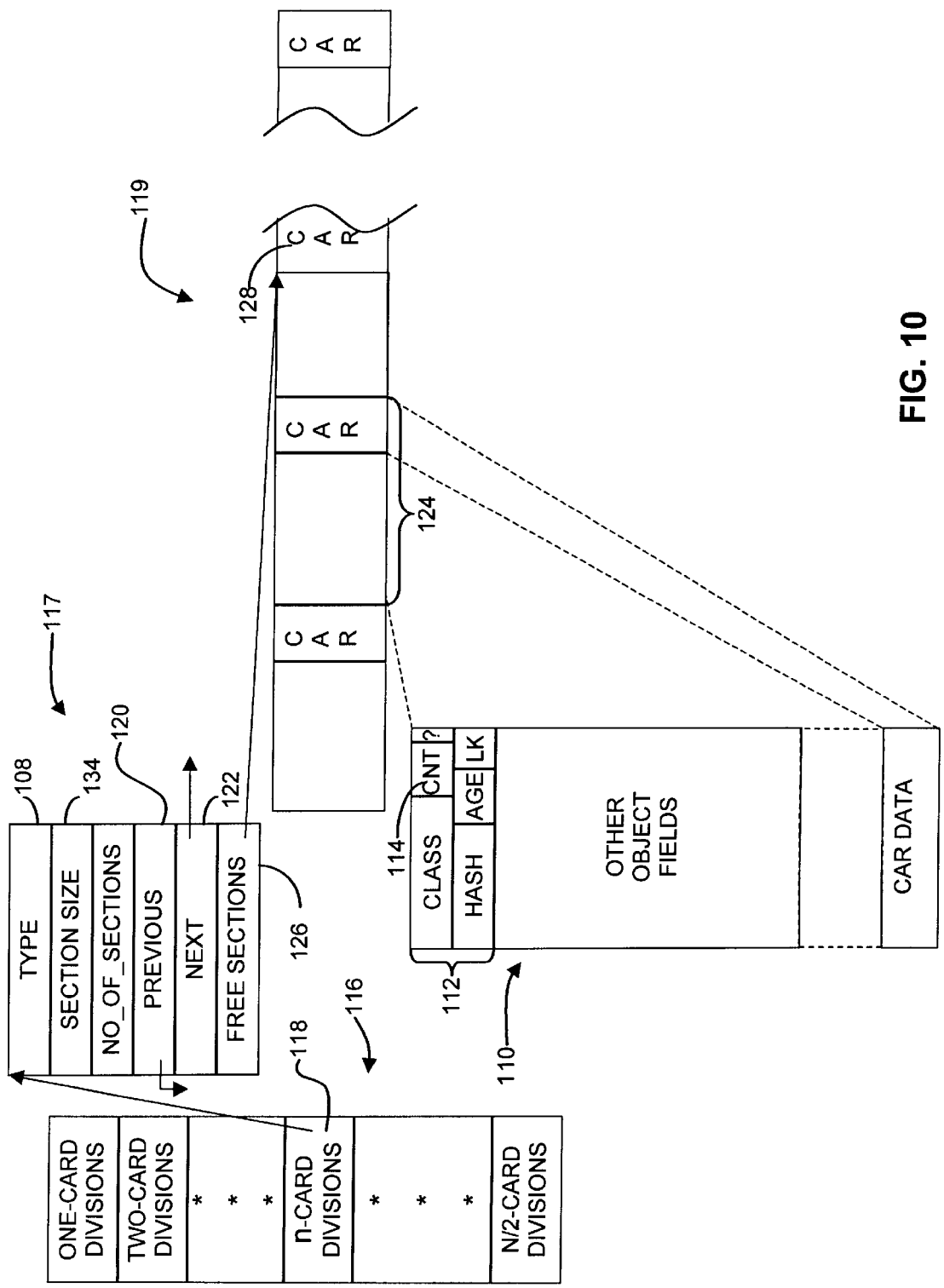
FIG. 10 depicts data structures used in support of a "popular sideyard" employed for popular-object storage.

In the illustrated embodiment, that structure may instead manage a memory section that contains more than one (special-size) car section. So structure 100 includes a field 108 that indicates whether the heap space associated with the structure is used (1) normally, as a car section that can contain multiple objects, or (2) specially, as a region in which objects are stored one to a car in a manner that will now be explained by reference to the additional structures that FIG. 10 illustrates.

To deal specially with popular objects, the garbage collector may keep track of the number of references there are to each object in the generation being collected. Now, the memory space 110 allocated to an object typically begins with a header 112 that contains various housekeeping information, such as an identifier of the class to which the object belongs. To keep track of an object's popularity, the header can include a reference-count field 114. When the garbage collector locates references into the collection set during the collection cycle by processing the collection-set cars' remembered sets, it increments the reference-count field in the header of each collection-set object to which it finds a reference. Each time it does so, it tests the resultant value to determine whether the count exceeds a predetermined popular-object threshold. If so, it removes the object to a "popular sideyard" if it has not done so already.

Specifically, the collector consults a table 116, which points to linked lists of normal car-section-sized regions intended to contain popular objects. Preferably, the normal car-section size is considerably larger than the 30 to 60 bytes that has been shown by studies to be an average object size in typical programs. Under such circumstances, it would therefore be a significant waste of space to allocate a whole normal-sized car section to an individual object. For reasons that will become apparent below, the collector places each popular object into its own, single car section. So the normal-car-section-sized regions to which table 116 points are to be treated as specially divided into car sections whose sizes are more appropriate to individual-object storage.

To this end, table 116 includes a list of pointers to linked lists of structures associated with respective regions of that type. Each list is associated with a different object-size range. For example, consider the linked list pointed to by table 116's section pointer 118. Pointer 118 is associated with a linked list of normal-car-sized regions organized into n-card car sections. Structure 117 is associated with one such region and includes fields 120 and 122 that point to the previous and next structure in a linked list of such structures associated with respective regions of n-card car sections. Car-section region 119, with which structure 117 is associated, is divided into n-card car sections such as section 124, which contains object 110.

More specifically, the garbage collector determines the size of the newly popular object by, for instance, consulting the class structure to which one of its header entries points. It then determines the smallest popular-car-section size that can contain the object. Having thus identified the appropriate size, it follows table 116's pointer associated with that size to the list of structures associated with regions so divided. It follows the list to the first structure associated with a region that has constituent car sections left.

Let us suppose that the first such structure is structure 117. In that case, the collector finds the next free car section by following pointer 126 to a car data structure 128. This data structure is similar to FIG. 9's structure 100, but in the illustrated embodiment it is located in the garbage-collected heap, at the end of the car section with which it is associated. In a structure-128 field similar to structure 100's field 129, the collector places the next car number of the train to which the object is to be assigned, and it places the train's number in a field corresponding to structure 100's field 101. The collector also stores the object at the start of the popular-object car section in which structure 128 is located. In short, the collector is adding a new car to the object's train, but the associated car section is a smaller-than-usual car section, sized to contain the newly popular object efficiently.

The aspect of the illustrated embodiment's data-structure organization that FIGS. 9 and 10 depict provides for special-size car sections without detracting from rapid identification of the normal-sized car to which a given object belongs. Conventionally, all car sections have been the same size, because doing so facilitates rapid car identification. Typically, for example, the most-significant bits of the difference between the generation's base address and an object's address are used as an offset into a car-metadata table, which contains pointers to car structures associated with the (necessarily uniform-size) memory sections associated with those most-significant bits. FIGS. 9 and 10's organization permits this general approach to be used while providing at the same time for special-sized car sections. The car-metadata table can be used as before to contain pointers to structures associated with memory sections whose uniform size is dictated by the number of address bits used as an index into that table.

In the illustrated embodiment, though, the structures pointed to by the metadata-table pointers contain fields exemplified by fields 108 of FIG. 9's structure 100 and FIG. 10's structure 117. These fields indicate whether the structure manages only a single car section, as structure 100 does. If so, the structure thereby found is the car structure for that object. Otherwise, the collector infers from the object's address and the structure's section_size field 134 the location of the car structure, such as structure 128, that manages the object's special-size car, and it reads the object's car number from that structure. This inference is readily drawn if every such car structure is positioned at the same offset from one of its respective car section's boundaries. In the illustrated example, for instance, every such car section's car structure is placed at the end of the car section, so its train and car-number fields are known to be located at predetermined offsets from the end of the car section.

Figure 11A:
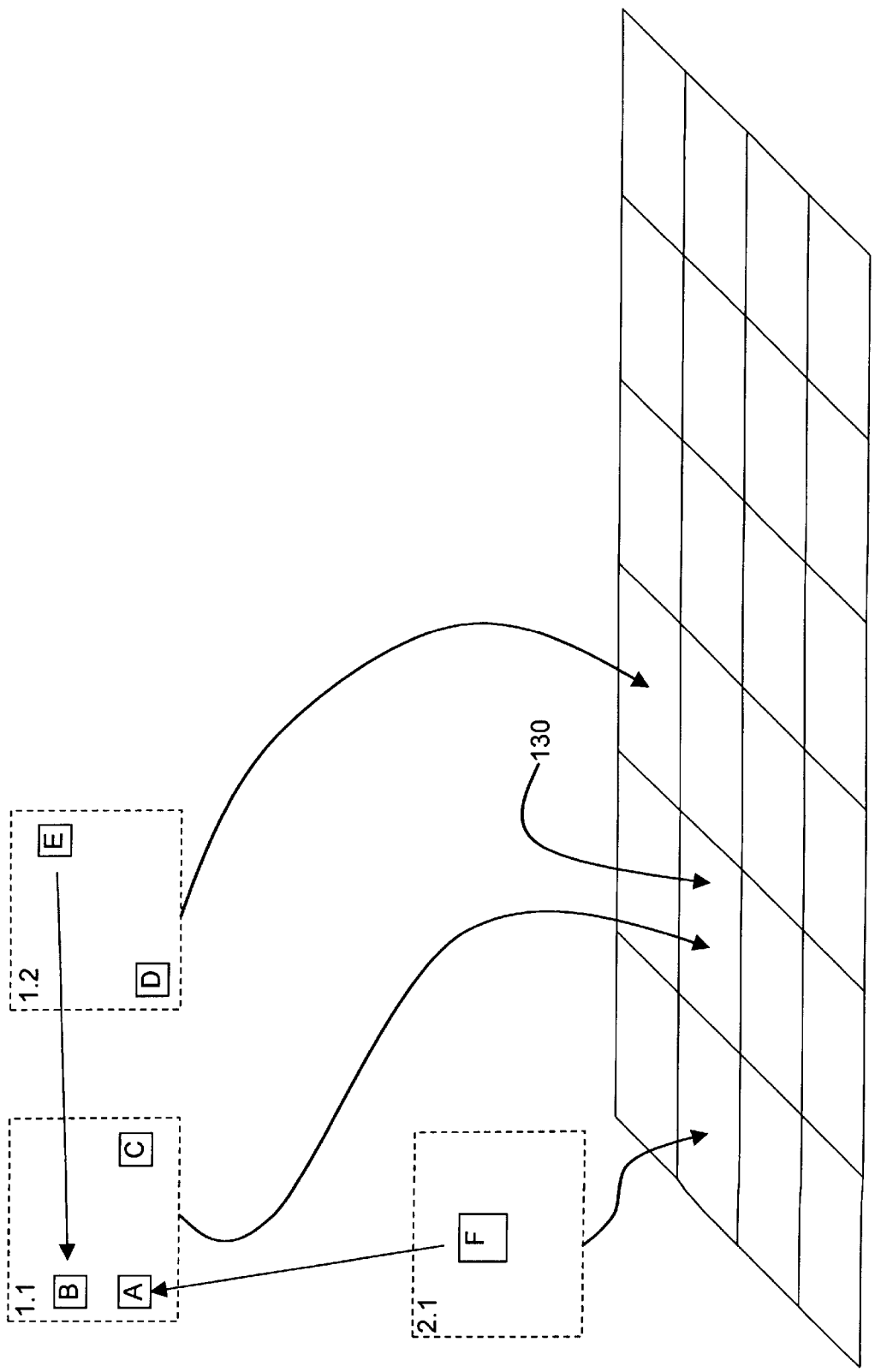
FIGS. 11A and 11B are diagrams that depict conventional train-algorithm object relocation.

To appreciate the effect that allocating popular objects to individual cars can have, consider the process of evacuating FIG. 11A's object A from car 1.1 during the collection of that car. (For consistency with FIGS. 8A–J, the object symbols are again placed inside the car symbols, but, of course, the actual object data reside in the car sections that the car structures specify.)

Figure 11B:
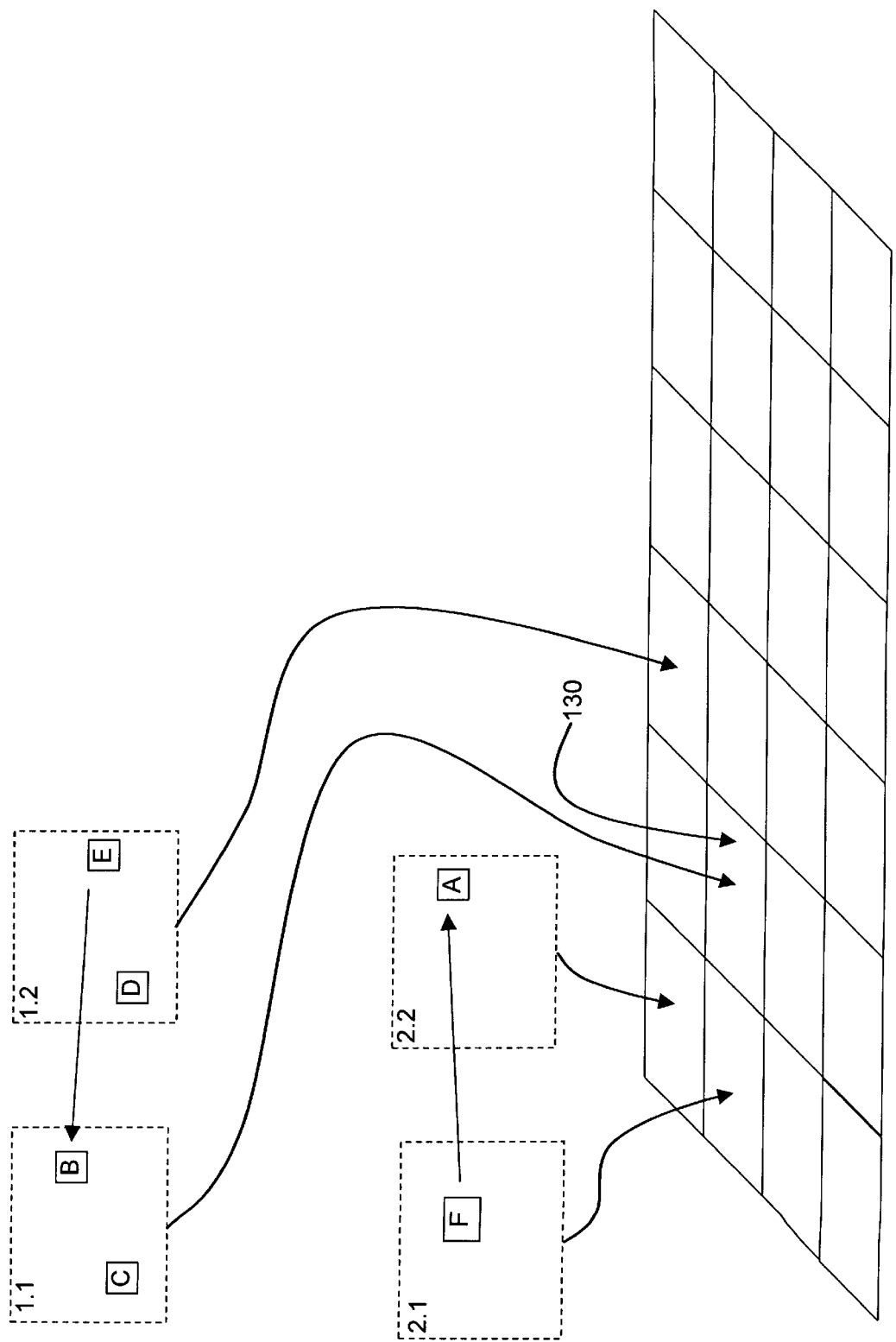

FIG. 11A depicts object A as being referred to by object F, which resides in a car section associated with card 2.1, i.e. in a train newer than that in which object A resides. The train algorithm therefore requires that object A be evacuated to object F's train. This could be done by moving object A's data into the car section associated with car 2.1. Another alternative, depicted in FIG. 11B, is to begin a new car in object F's train and place object A's data in the associated car section. This is the approach conventionally taken when a previous car did not have enough room for the object being copied.

In either case, a result is that object F's reference to object A needs to be updated; a comparison of FIGS. 11A and B reveals that object A is necessarily moved to a different memory-space location. But the actual physical copying—and thus the pointer-update—are necessary in the illustrated case only because the car section 130 associated with object A's previous car 1.1 contains other objects, which will not in general end up in the car that object A newly occupies. In other words, if object A had started the collection cycle in its own car and were to end it in its own car, the only operation needed to place object A into a new car would be to relink the car data structures; no reference updates would be necessary. In the illustrated scenario, of course, updating object F's single pointer to object A would typically take less time than re-linking. For popular objects, though, the number of pointers requiring updating can be extremely large, so the benefit of changing car membership solely by relinking is significant.

The collector therefore places popular objects in their own cars, as was mentioned above. FIG. 12A illustrates the result of this policy. For the sake of illustration, FIG. 12A shows region 130 as divided into smaller car sections sized to accommodate objects the size of object A. FIG. 12B illustrates moving object A to a new car, but it also indicates that object A remains stored in the same memory-space location. Since object A has not moved, object F's reference to it remains the same, as do all other (not shown) references to object A.

Now, object A's reference count may be less than the popular-object threshold even though it is located in a popular-object car; i.e., it may have been placed in its popular-object car during a previous collection cycle, when its reference count was higher. An advantageous feature of the illustrated embodiment is that it permits such previously popular objects to be returned to regular cars. And a way of taking advantage of this capability involves selective re-linking of popular cars.

To appreciate the role that this re-linking plays in the collection cycle, it helps to review the overall sequence of a collection cycle. At the beginning of a collection cycle, the card table is updated by scanning all cards marked by a write barrier as modified since the last collection cycle. For a generation that uses the train algorithm, this rescanning of modified cards not only locates references into younger generations but also updates the appropriate remembered sets for cars in the same generation. As was mentioned above, one of the difficulties associated with popular objects is that they tend to cause overly large remembered sets. In the illustrated embodiment, though, any remembered set associated with a popular-object car is allocated only a fixed amount of memory, and no further reference-identifying entries are made after the allocated memory is exhausted. Instead, the collector only updates a field that identifies the youngest train that contains a reference to the object in that car. Although the resultant remembered set is incomplete, the collector operates in such a way that the object's memory space is not reclaimed prematurely. This will be described after a further review of the collection-cycle sequence.

After the card table is processed and the remembered sets updated, any younger generations are collected. For the sake of example, let us assume that the garbage-collected heap is organized into two generations, namely, a young generation, which is completely collected during every collection cycle, and a mature generation, which is collected incrementally in accordance with the train algorithm. The young generation's collection may involve promotion of some objects into the mature generation, and a new train will typically be allocated for this purpose, unless an empty train already exists. When the young generation's collection is completed, collection of the generation organized in accordance with the train algorithm will begin, and at this point a new train will typically be allocated, too, unless the newest existing train is already empty.

The number of cars to be collected during this cycle is then determined in accordance with whatever policy the particular implementation uses. That number of cars lowest in the sequence are identified as the collection set, possibly by removing them from the trains to which they belong, linking them together in a single list, and setting per-car flags that indicate that they are parts of the collection set.

It is at this point that the re-linking referred to above occurs. The collector identifies the collection-set cars that are of the special popular-object variety. For each car thus identified, it checks the number of entries in the associated remembered set. As was mentioned above, the illustrated embodiment allocates only a fixed amount of memory space to each popular-object car's remembered set; if such a remembered set becomes too full, the collector stops adding entries to it. But it does keep updating a youngest-car value, associated with that car, that tells which is the youngest train that has a reference to that car's object. So, if the number of entries in the remembered set of a collection-set car identified as being of the popular-object variety is large enough to indicate that the collector may have omitted entries for further references, the collector assumes that the object contained in the car is still popular, and the car is immediately re-linked into the train that the youngest-car value identifies. Since the remembered set is to contain the addresses only of references from younger trains or younger cars in the same train, the collector accordingly empties the remembered-set list. Potentially, therefore, the associated remembered set will not be as full when the object comes up for collection again.

Note that, although the collector has assumed that the object is still popular, it does not really know that it is. The object's reference count is zero at the beginning of the collection cycle and not incremented until the updated remembered sets are processed, as has not yet happened. The collector therefore cannot rely on that value. Also, some of the remembered-set entries, on which the still-popular assumption was based, may be "stale"; this cannot be known, either, until the remembered-set entries are processed. On the other hand, an object may still be popular even if most of the remembered-set entries prove to be stale; there may be many other, "live" references for which the memory allocated to the remembered set had no further room for entries.

As was just explained, though, the collector nonetheless treats the object as though it is still popular and re-links its (popular-object) car section into a train young enough that the car section's remembered set can be cleared. (Remember, the illustrated embodiment's remembered set contains entries only for references from younger trains.) If in fact the object had only a few surviving references, its remembered set will be small and no longer qualify it for the popularity assumption when that object next becomes part of a (subsequent) collection cycle's collection set—at least if it has not again become popular in the interim.

Although popular-object cars for which the number of remembered-set entries exceeds a threshold are linked into new trains immediately, as was just explained, the remainder stay in the collection set for processing with normal cars. That is, their remembered sets are processed to build per-train scratch-pad lists of references into the collection set. In the process, each collection-set object's reference count, which starts at zero at the beginning of the collection cycle, is incremented each time a reference to it has been found. As was explained above, when all of the collection set's remembered sets have thus been processed (and cleared), the collector begins with the youngest train's scratch-pad lists of references and evacuates from the collection set into the respective train the objects to which the references refer.

If the object is in a normal car section but its reference count exceeds a predetermined threshold, then it is placed into a popular-object car section, as was explained above. On the other hand, if the reference count of an erstwhile popular object reveals that it is no longer popular, it is evacuated into a regular car section if it is not reclaimed. In order to introduce some hysteresis into popular-object car-section assignment, the threshold for indicating that an object is no longer popular will typically be made somewhat lower than the threshold used to determine that an object is newly popular.

After the remembered-set processing, the collector processes any references from outside the generation into the collection set, as was also explained above, and all collection-set objects thereby identified as having been referred to externally are placed into the youngest train.

The scratch-pad list for the oldest train is then processed, after which the collector determines whether there are any references into the oldest train from trains outside it. If so, the collector reclaims any initial sequence of the current train's car sections into which no references remain. Otherwise, all of its car sections are reclaimed. Preferably, the test for such references is performed not only for the oldest train but also for other trains as well. One approach is to test the trains in order from the oldest to the youngest, reclaiming each train's car sections until a train is encountered into which references from outside it remain. This completes the collection cycle.

Popular objects are not the only ones whose placement into small, one-object car sections is advantageous. In virtual-machine contexts, for instance, the interface from the virtual machine to so-called native methods not written in the virtual machine's language must frequently make copies of objects that are subject to relocation by the collector. But the interface can avoid this copying, which can be quite time-consuming in the case of large objects, if it is known that the collector will not relocate the object. An example of a type of object for which this problem can arise frequently is the I/O buffer. Although such buffers are large, normal-size car sections tend to be much larger, so it would be wasteful to dedicate a whole normal-sized car section to an I/O buffer in order to avoid relocation and copying. Also, evacuation by copying takes more operations for larger objects than for smaller ones. Placing larger objects in one-object sections reduces the cost of evacuating them, since it enables the evacuation to be done simply by re-linking, without re-locating.

But such waste is unnecessary, because "oversized" objects can be placed in car sections that are considerably smaller than those used for multiple objects and thereby remain stationary without wasting space excessively. In the illustrated collector, an object can be a relatively small fraction of the normal car-section size and still be considered oversized. Such an object is stored in a special-size car section, just as a popular object is. However, it is marked as being oversized by, say, placing an appropriate entry in its car-structure field corresponding to FIG. 9's field 132. For instance, that field may be provided as a four-byte field, with one of the bytes indicating whether the object is oversized and others indicating whether it is popular and whether it has only recently become so. (There are reasons not relevant to the present discussion why it may be convenient to distinguish newly popular objects from other popular objects.)

An oversized object thus placed in a special-sized car section is handled largely in the manner described above for popular objects. Preferably, its remembered set, too, is allocated only a fixed amount of storage, so its car section is subjected to immediate relinking when its remembered set gets too full, just as a popular object's is. The main difference is that an oversized object's reference count is not tested to determine whether the object will remain in the special car section; an object that starts out oversized remains oversized.

While the assignment of popular objects to their own cars eliminates the reference-update problem that popular objects present, it does nothing about another popular-object problem, which is the burden that such objects impose on the task of maintaining remembered sets. For popular-object cars, this burden is somewhat contained by the fact that remembered sets are not allowed to grow beyond a predetermined size. But objects considerably less popular than the ones that qualify for their own cars may also be afflicted with this problem.

Figure 13:
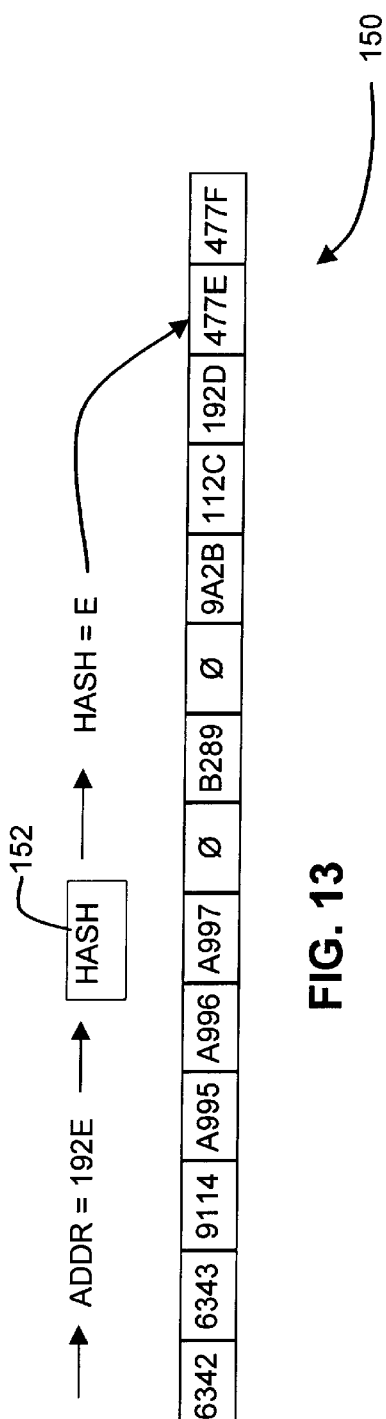
FIG. 13 is a diagram that illustrates the use of a hash table to store a remembered set used in support of the train algorithm.

To appreciate the remembered-set-maintenance problem, consider FIG. 13, which illustrates one of the many types of reference-list organizations that embodiments of the present invention may employ. There is theoretically little limit to a remembered set's size; if an object is referred to by every other object in the generation, for instance, the remembered set for that object's car could be a significant fraction of the entire generation size. But it does not make sense to allocate that much space to each remembered set initially, and FIG. 13 depicts a memory space 150 allocated to the remembered set's reference list as containing only sixteen reference-sized locations.

At the beginning of each collection cycle, the collector inspects modified cards, as was mentioned above, and makes sure that any references from cars to cars farther forward in the queue are reflected in those farther-forward cars' remembered sets. That is, when the collector encounters such a reference, it should place the address of that reference into the remembered set of the referred-to object's car. But it should do so only if the remembered set does not already contain that address: the collector should avoid duplicates.

There are many approaches to achieving this result, and FIG. 13 illustrates one of them for the sake of concreteness. Let us suppose that the reference of interest occurs at a location whose address is 192E. To determine where to place this address in the memory space 150 allocated to the reference list, the collector applies a hash function 152 to the address. In the illustrated example, the hash function is simply the address's four least-significant bits, whose hexadecimal representation is $E_H$. The collector uses this value as an offset into the list, but it does not immediately store the address at the list location thus identified. It first reads that location's value to determine whether another address has already been stored there. In the FIG. 13 scenario, one already has.

Now, if that already-stored address were itself 192E, resulting from an entry made during a previous collection cycle, the collector would recognize that a duplicate had occurred, and it would stop its attempt to store the value. But the already stored address in the illustrated example is instead 477E, so the collector proceeds to the next reference-list location. This location, too, contains a non-NULL value that differs from the address to be stored. Since that location is at the end of the list, the collector proceeds circularly to the beginning of the list and repeats the test there. Again, the location is already occupied, so it proceeds still further, and this time it finds an empty location.

Even though the collector has not inspected every list entry, it can infer from encountering the empty location that the list has no duplicates of the entry to be added. Any previous attempt to store the same value would have taken the same steps, and the collector would accordingly have encountered the duplicate in attempting to find a space for this address. The collector therefore has simultaneously found a location and avoided duplication.

With the small list that FIG. 13 depicts, this approach to adding reference-list entries is fairly economical. But it does not scale particularly well. A car that includes a more-popular object may require a remembered-set reference list that is large indeed, and the amount of time taken to find a free location can significantly degrade performance. The illustrated collector provides two different ways of reducing this performance impact. In the illustrated embodiment, the previously described approach of employing fixed-size remembered sets is used for popular-object cars, while an approach about to be described is used for regular cars, although there is no reason in principle why the two approaches' uses need to be divided up in this manner.

Figure 14:
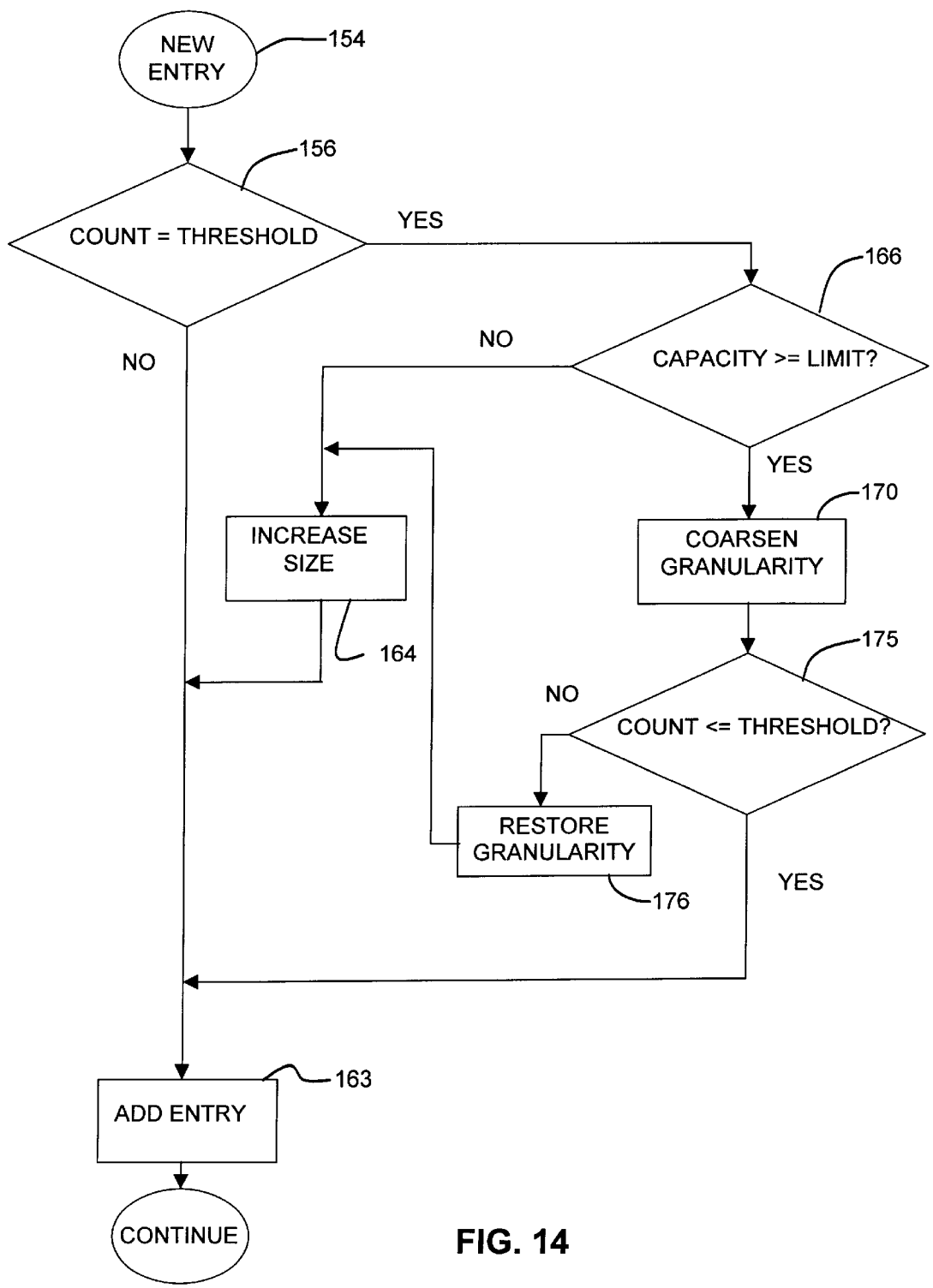
FIG. 14 is a flow chart of a procedure for adding a new remembered-set entry.

The approach used for regular cars is to adjust remembered-set granularity dynamically. FIG. 14 is a flow chart that illustrates one way of entering new remembered-set addresses in accordance with this approach. Block 154 represents beginning the process, and block 156 represents a test, which will now be described, for determining whether the space allocated to the list is already too full.

Figure 15:
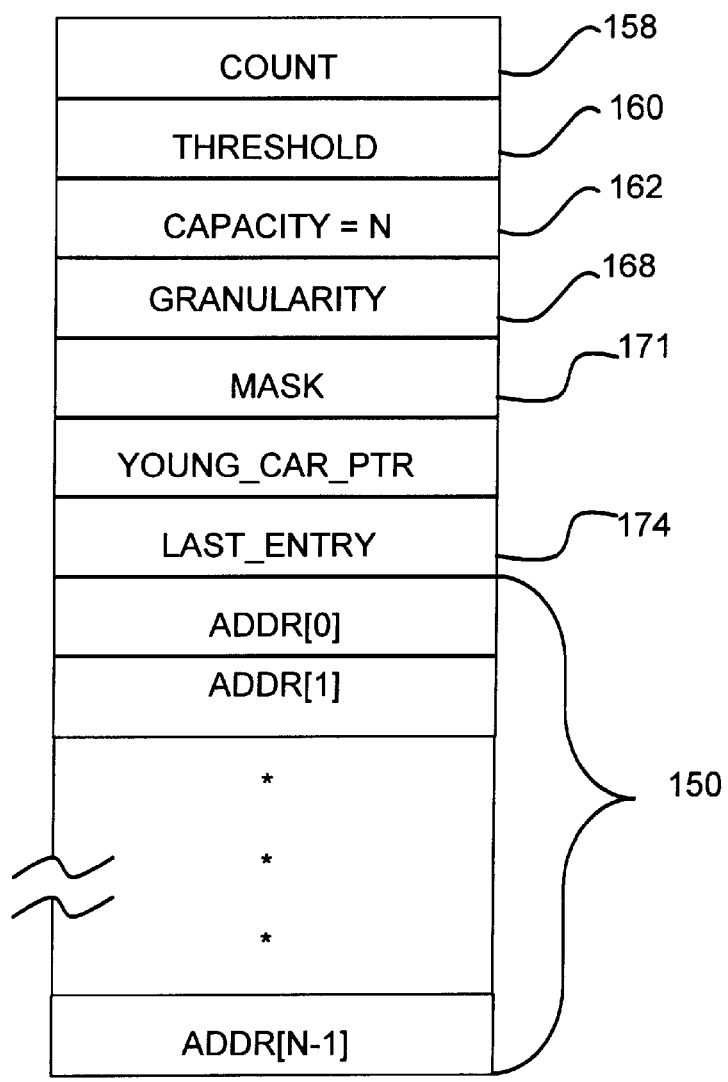
FIG. 15 is a block diagram of a remembered-set structure.

Now, a review of FIG. 13 reveals that the time required to find space for a new entry and avoid duplication increases disproportionately as the list becomes nearly full. To avoid this, the remembered-data structure may take a form such as the one that FIG. 15 illustrates. Whenever the collector makes an entry into the list, it increments the value of that structure's COUNT field 158 so that the field's contents represent the number of entries in the list. Fields 160 and 162 represent a threshold and the list's current capacity. The threshold, which may be, say, 70% of the capacity, is used to determine whether the list is too full for efficient operation.

If the count has not reached the threshold, the new entry is simply added, as FIG. 14's block 163 indicates. Otherwise, the collector increases the memory space allocated to the list, as block 164 indicates, unless the list size has already reached a limit value for which the step of block 166 tests. The size-increase operation of block 164 includes allocating more space to the list and re-entering the address values. For instance, the list size may be doubled and the hash-function output given an additional bit so that the address entries will be spaced more sparsely. This tends to reduce the time required to find an empty list location.

If the list size reaches the limit against which step 166 tests, the collector attempts to reduce the number of entries by increasing the granularty with which the entries specify reference locations. For example, the size of the region that each address entry is interpreted as specifying may change from only large enough to contain a single reference to one large enough to contain sixteen of them. This will be indicated by a change in a granularity indicator in FIG. 15's remembered-set field 168. To determine where references to the numbered set's car are located, the collector will consult the granularity entry and inspect the entire sixteen-location region for a reference into the car.

Figure 16:
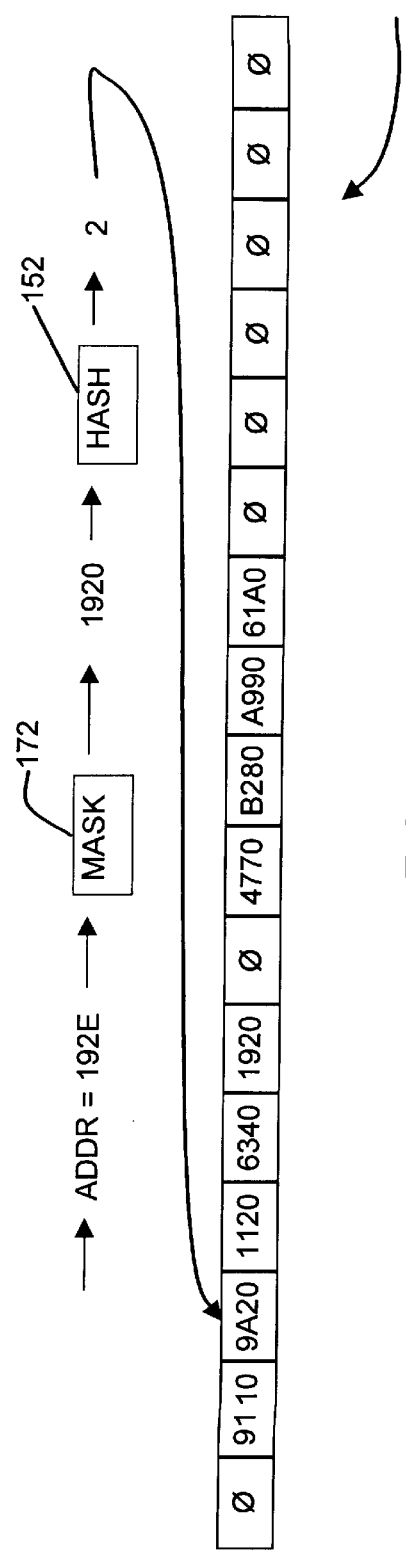
FIG. 16 is a hash-table diagram similar to that of FIG. 13 but depicting contents that identify regions with coarser granularity.

This granularity-coarsening operation, which block 170 represents, comprises masking the list's address entries and then entering the result. FIG. 16 illustrates this operation. Again, the address to be added is 192E, but in this case the granularity is sixteen, so the last four bits ($2^4$=16) are masked to yield an entry value of $1920_H$. The hash function 152 is changed to least-significant four bits of the unmasked address portion, so the hash value is now $2_H$.

The size of the table into which the hash value points is the same as that of the FIG. 13 table, but the entries have been masked and stored in accordance with their respective new hash values. This usually results in fewer total entries. Let us assume, for instance, that the collector assigns a threshold value of twelve to a list whose capacity is sixteen. In FIG. 13, this limit has been exceeded: the number of entries is thirteen. With the granularity increase, the resultant number of entries depicted in FIG. 16 is nine, which is less than the threshold value.

Of course, the time required to store any individual entry is not always less than before the granularity coarsening; as FIG. 16 shows, the collector actually has to inspect four entries before it finds that a further entry is unnecessary. But the delay still tends to be less on average.

Moreover, granularity coarsening can increase the effectiveness of optimizations such as single-entry caches. As FIG. 15 shows, the illustrated embodiment's remembered-set data structure includes a LAST_ENTRY field 174. This serves as a single-entry cache, into which the collector places a copy of the address entry that it has last placed in the list. Before the collector attempts to add an entry to the list, it first compares the LAST_ENTRY value with the masked value of the address to be added. It may thereby determine that the address to be added is a duplicate.

For instance, note that the fourteenth location in FIG. 13 has the contents 192D. Suppose that this was the last entry made before the current one. After masking, that value is 1920, which is the same as the masked value of the new entry. So comparison with the single-element cache 174 immediately reveals that the new entry would be a duplicate, and the collector therefore does not need to process it further.

FIG. 16 depicts the situation in which coarsening the granularity has opened up enough space in the list to add entries efficiently. But a review of the transition between FIG. 13 and FIG. 16 also reveals that this is not a necessary result. FIG. 14's block 175 accordingly represents the step of determining whether enough space has in fact resulted from the coarsening operation. If not, one could coarsen the granularity still further, but the embodiment that FIG. 14 illustrates instead restores the previous granularity, as block 176 indicates, and then increases the size, in a step represented by block 164. This results in a reasonable compromise between storage requirements and the time required to locate references in a region that a remembered-set address-list entry specifies.

Although the above description of the FIG. 13 situation implies that each remembered set begins with single-byte granularity, it will probably be found preferable in most applications to start with a granularity somewhat coarser than this. This enables a technique that will now be described to be employed to its best advantage.

The description of an example train-algorithm scenario set forth above in connection with FIGS. 8A–J made the simplifying assumption that each collection cycle collected only a single car. But it is preferable for the collection-set size to be dynamically adjustable in accordance with current conditions. Strategies for doing this differ, but one example is to set collection-set size to a value that approximately equals the average amount of space recently allocated between collection cycles. The fixed normal car size used in support of such a strategy would equal the increment by which collection-set size can be adjusted.

Now, the reason for maintaining a separate remembered set for each car is that it cannot be known ahead of time which cars will be grouped together in a given collection set. Once the collection-set size is determined for a given collection cycle, though, the above-described process of evacuating objects from the collection set can largely be performed as though all of the collection-set objects occupy the same car.

But the fact that they do not actually occupy the same car tends to impose inefficiencies. In particular, since the different cars' remembered sets were necessarily maintained separately, they are quite likely to specify reference-containing regions redundantly. That is, a region scanned once in response to a remembered-set entry for one of the collection-set cars may also be specified by another collection-set car's remembered set. Clearly, re-scanning the same region is wasteful. But attempts to avoid this waste are complicated by the fact that the different remembered-set entries may well specify reference-containing regions with different granularities. The illustrated collector provides a way of dealing with this complication, as will now be explained.

Figure 17A:
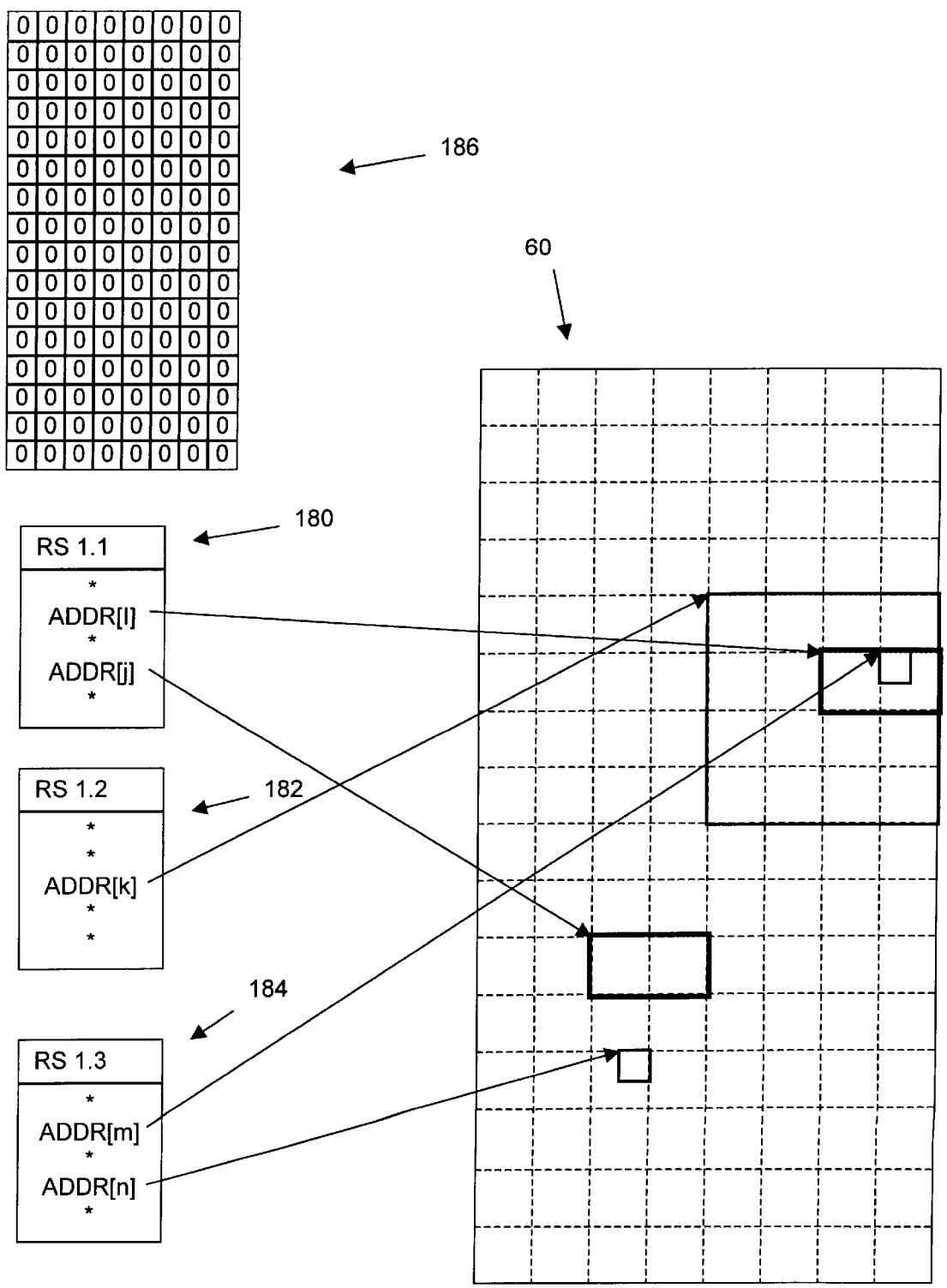
FIGS. 17A–D are diagrams that illustrate scanning the garbage-collected heap for references during a collection cycle that employs a multiple-car collection set.

An array of Boolean values is associated with respective segments of the generation, and the collector marks the array during collection as it scans the corresponding regions to which the collection-set remembered-set entries direct it. Once a segment is marked, the collector does not again scan it. FIGS. 17A–D illustrate this approach. In FIG. 17A, we assume that the collection set has three cars, with which three remembered sets 180, 182, and 184 are respectively associated. As was mentioned above, all entries in the same remembered set identify their associated regions with the same granularity, but we will also assume here that the three remembered sets' granularities are all different. Specifically, the farthest forward car's remembered set 180 has a medium granularity, the remembered set 182 of the car next in line has a relatively coarse granularity, and the last car's remembered set 184 has a relatively fine granularity.

For reasons that will become apparent as the description proceeds, it is preferable for the collector to begin collection with the address entries in the remembered set having the coarsest granularity, i.e., in remembered set 182. FIG. 17A depicts one of the remembered set 182's address entries ADDR[k] together with the region in the generation's memory space 60 to which that address points. The region is relatively large because of the coarse granularity that remembered set 182 has acquired.

As was mentioned above, the collector proceeds largely as though all collection-set objects are in the same car. That is, when it inspects the region to which remembered set 182's address-list entry points, it searches not only for references into the car section associated with that remembered set car but also for references into the car sections managed by the cars associated with the other remembered sets 180 and 184. When it finds them, it proceeds in the manner described above for the case of the single-car collection set.

Figure 17B:
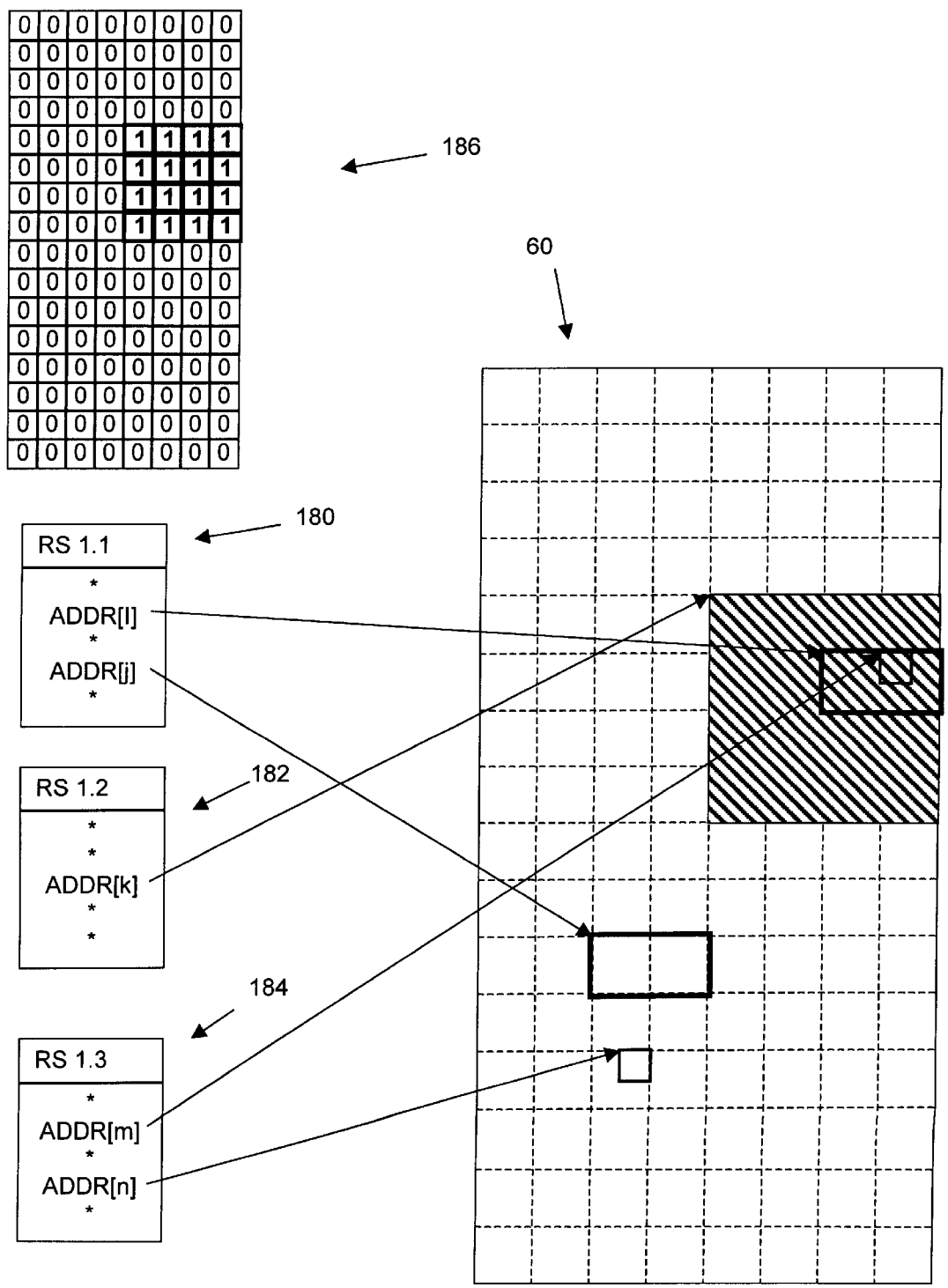
Figure 17C:
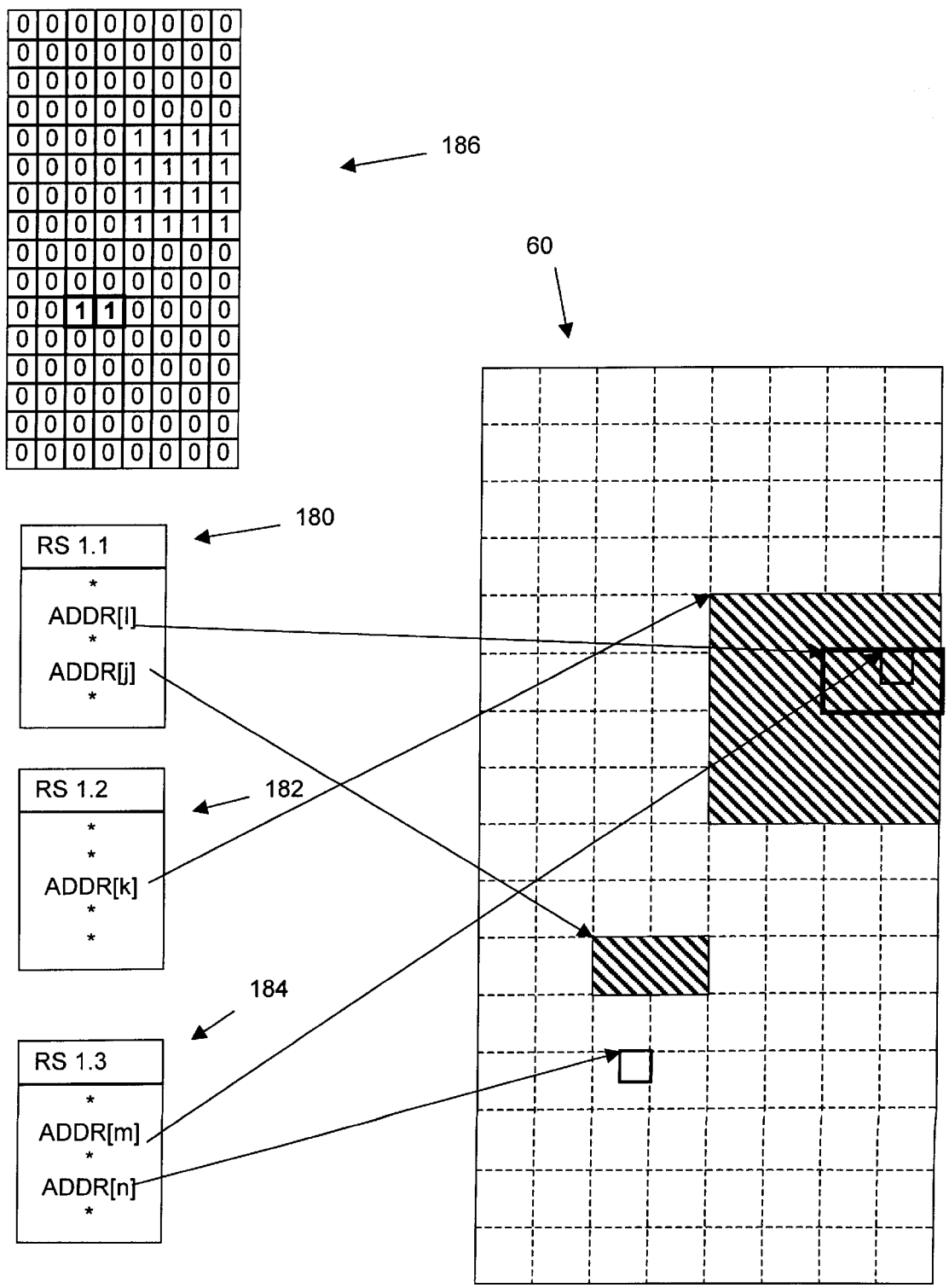
Figure 17D:
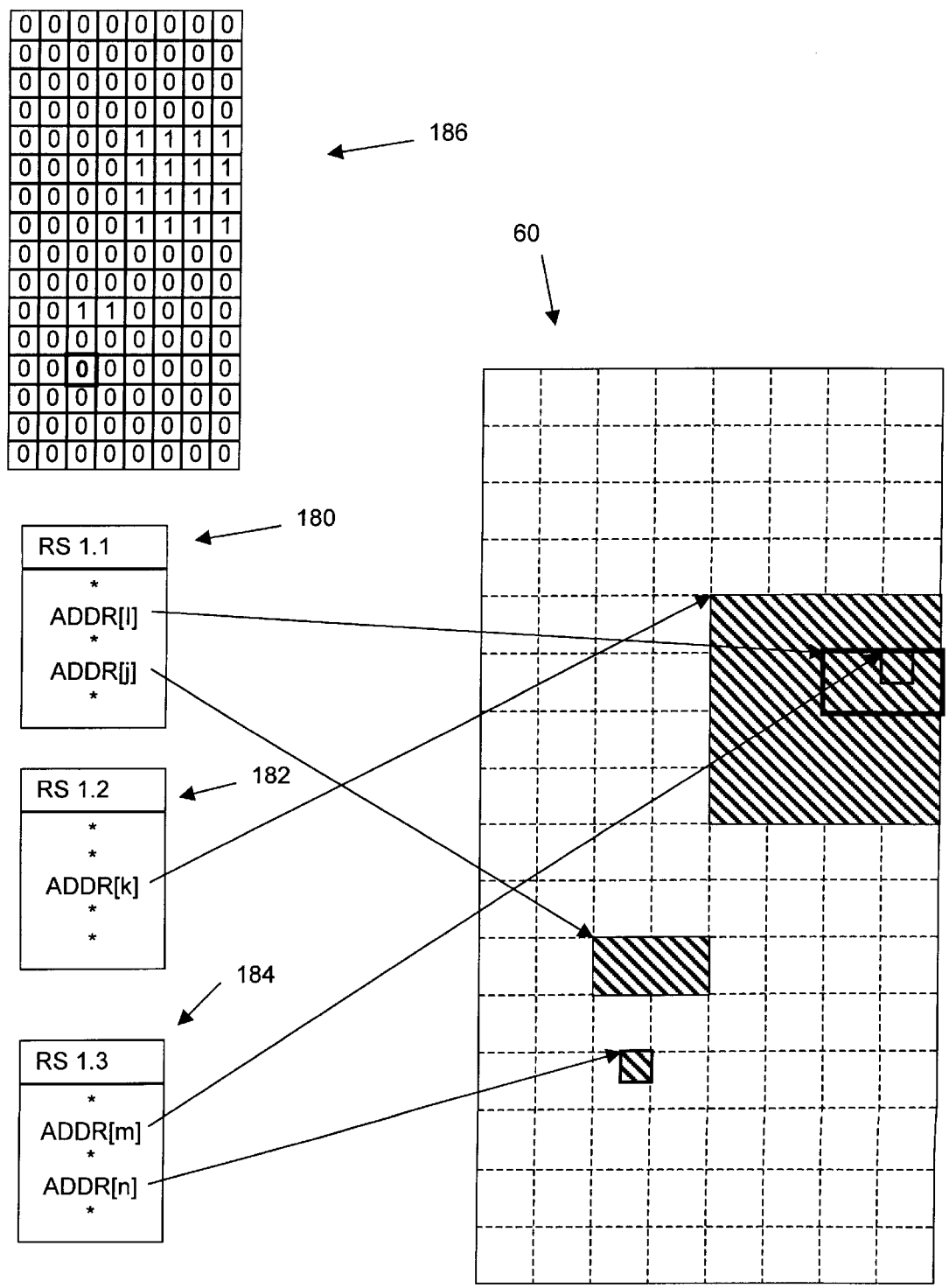

Additionally, the collector keeps track of where it has scanned. It does so by making marks in a Boolean array 186 that contains an entry for each of the memory-space segments into which FIG. 17A shows the generation's memory space 60 as being divided. As FIG. 17A illustrates, all of array 186's elements begin the collection cycle with the same value, depicted in FIG. 17A as zero. Once the collector has finished inspecting the region to which remembered set 182's illustrated address-list entry ADDR[k] points, the collector enters a second value, which FIG. 17B depicts as one, in the array elements that correspond to all of the memory-space segments within the region referred to by remembered set 182's address-list entry. It is most convenient for this segment size to equal that of the previously mentioned cards.

When the collector has processed all of remembered set 182's entries, it proceeds to remembered set 180, since that set has the next-coarsest granularity. In processing each of the address-list entries, it first consults the array to determine which segments in the associated region have already been searched. By processing the remembered sets in the order of their granularities, the illustrated embodiment can expedite this process if the regions identified by the remembered-set entries are aligned in accordance with their granularity, that is, if the address of each region's first byte is the same, modulo the region's size. Specifically, these conditions enable the collector to determine the values of all those segments' array elements by inspecting only a single array element—say, the first one—that represents a memory-space segment in the region to which the address-list entry refers.

In the case of entry ADDR[i], that entry has been switched to the value that indicates that the region has already been inspected for references into the collection set. The collector thereby knows not to re-inspect the indicated region, because it has already done so in connection with remembered set 182. On the other hand, the entry in array 186 that corresponds to the first segment in the region to which ADDR[j] refers contains a value indicating that it has not yet been processed, so the collector proceeds to inspect that region for references into the collection set. When it does so, it records the fact by entries in array 186, as FIG. 17C indicates.

Finally, the collector proceeds to process the finest-granularity remembered set 184. In this case, the granularity is finer than the segmentation on which the array 186 is based. By properly masking remembered set 184's address-list entries, though, the collector can still identify the encompassing segment. It thereby finds that the region to which ADDR[m] points has already been inspected, so it does not re-inspect that region.

But a similar review of the array element corresponding to the segment encompassing the region to which ADDR[n] points finds that the segment has not been inspected. The collector accordingly proceeds to inspect that segment for references into the collection set. Since the region that the collector thereby inspects does not span the entire segment to which it belongs, though, the collector refrains from marking that segment as inspected, as FIG. 17D indicates. If there were a further fine-granularity remembered set that has an address-list entry identical to ADDR[n], the collector would not be apprised of the repetition, and it would accordingly re-examine the indicated region. So most collectors that employ this feature will be so designed that their minimum granularities will correspond to the segment size used by their arrays for indicating which regions have already been scanned.

Another feature of the illustrated collector expedites collection-set processing even for collection cycles in which the collection set consists of only one car. According to this feature, the collector can abbreviate or eliminate the inspections it must perform in response to many of the collection-set address-list entries. This aspect, too, is based on dividing the generation into fixed-size segments. In particular, when the collector is searching a remembered-set-identified region for references into the collection set, it does not have to inspect any of that region's segments that have been identified, in a manner presently to be described, as having no references into cars as far forward as the collection set's.

Figure 1:
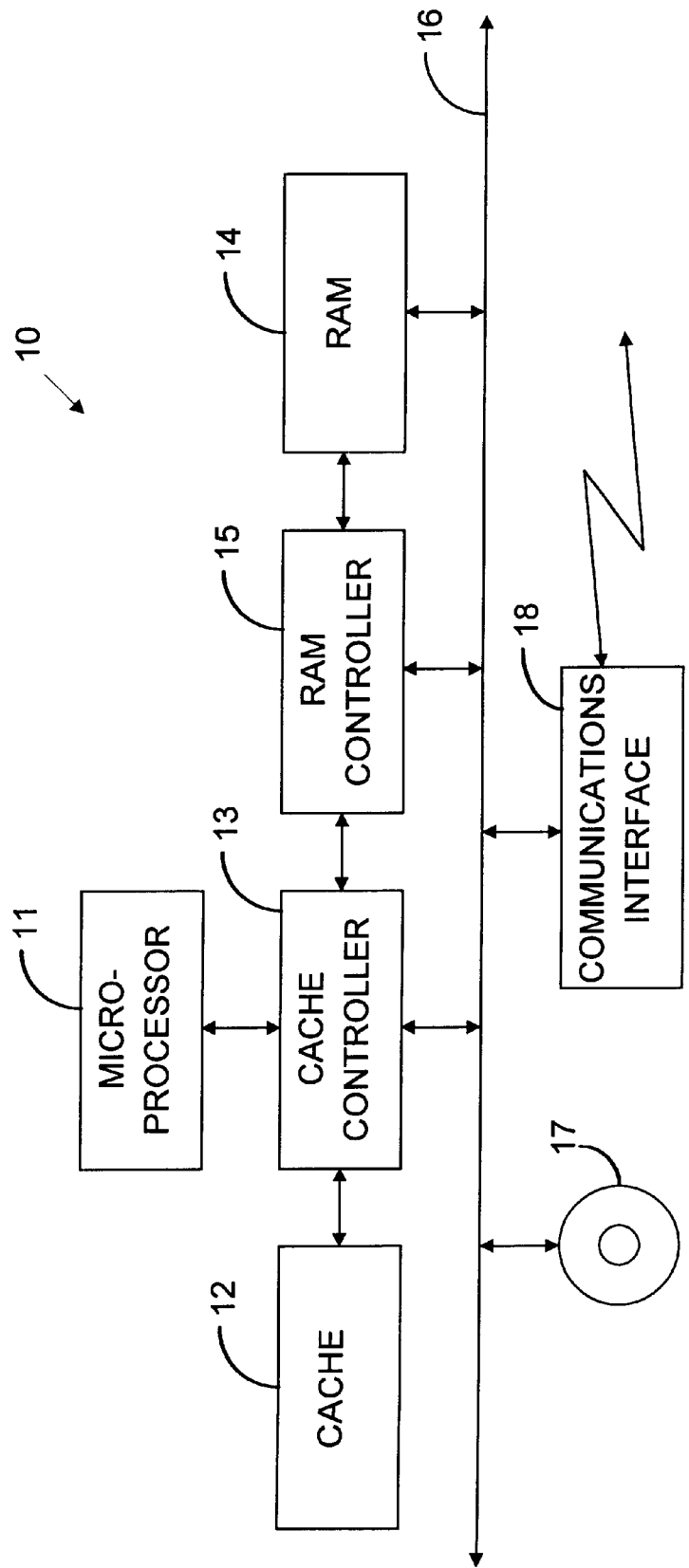
FIG. 1 is a block diagram of a computer system in which the present invention's teachings can be practiced.
Figure 2:
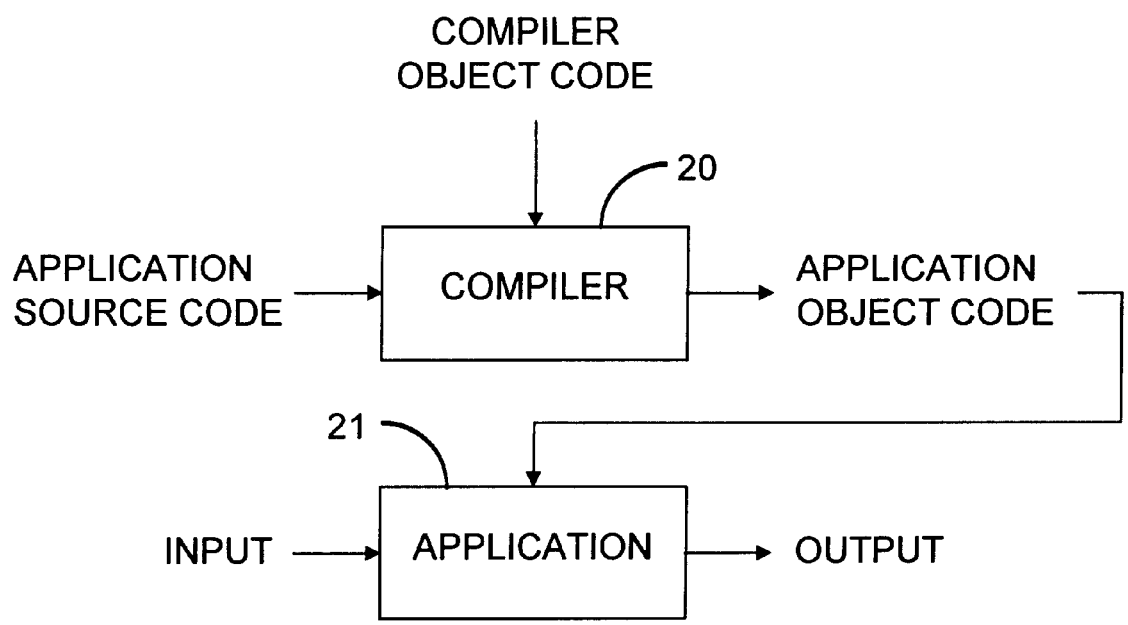
FIG. 2 is a block diagram that illustrates a compiler's basic functions.
Figure 3:
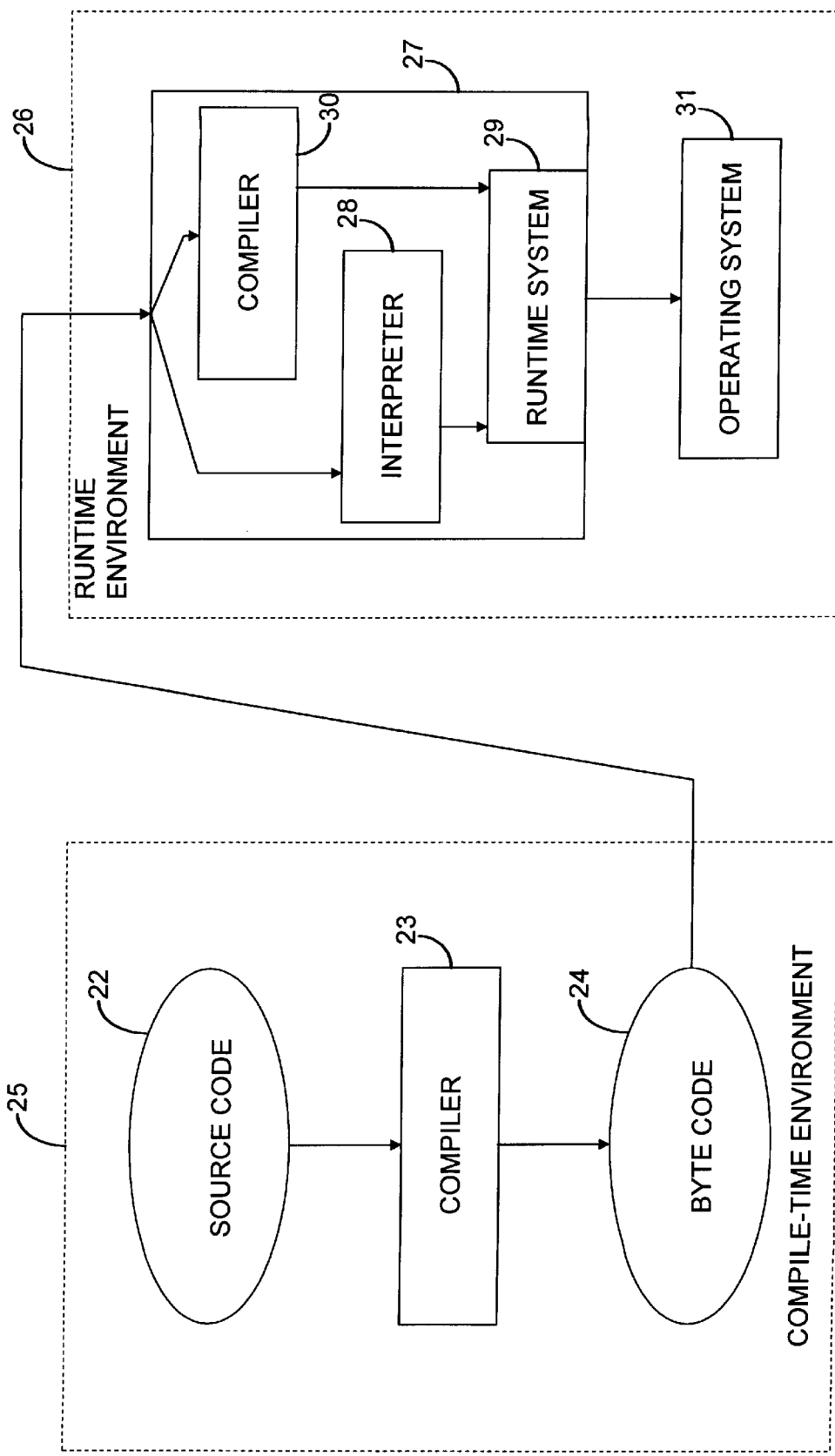
FIG. 3 is a block diagram that illustrates a more-complicated compiler/interpreter organization.
Figure 4:
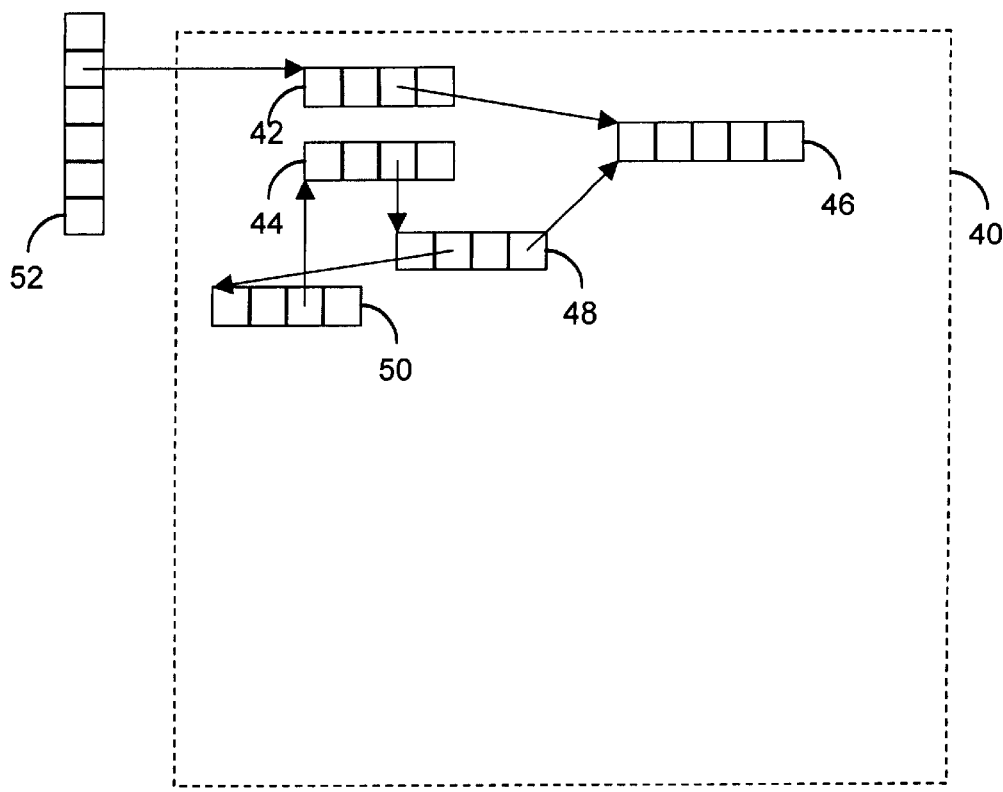
FIG. 4 is a diagram that illustrates a basic garbage-collection mechanism.
Figure 5:
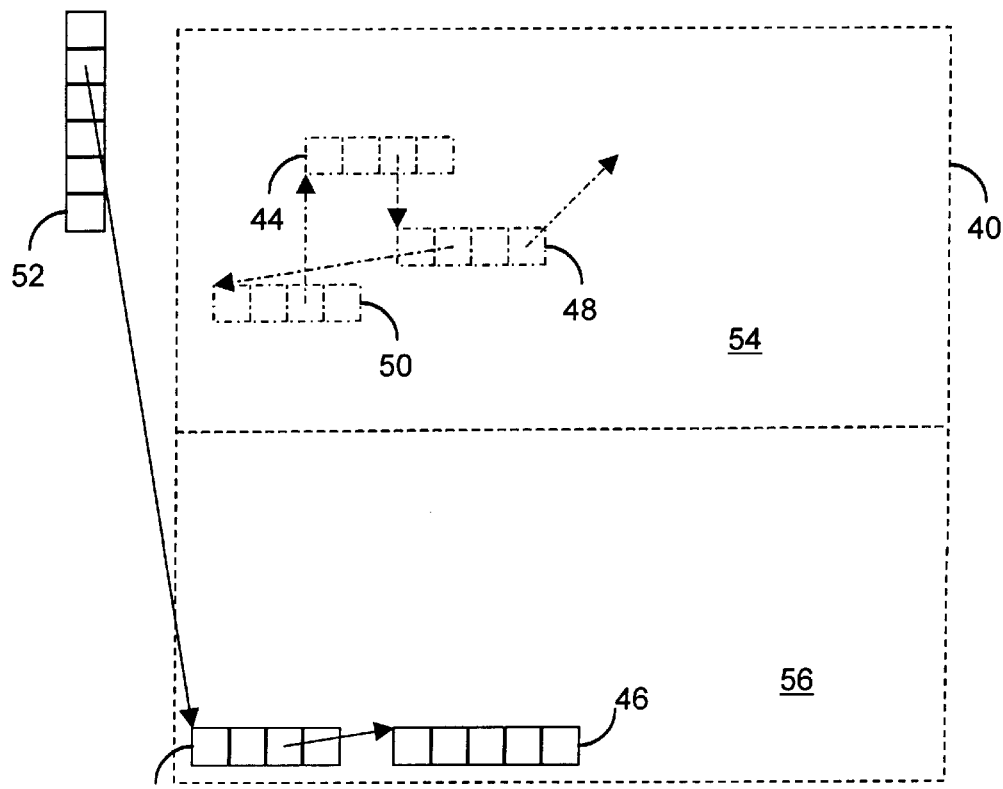
FIG. 5 is a similar diagram illustrating that garbage-collection approach's relocation operation.
Figure 6:
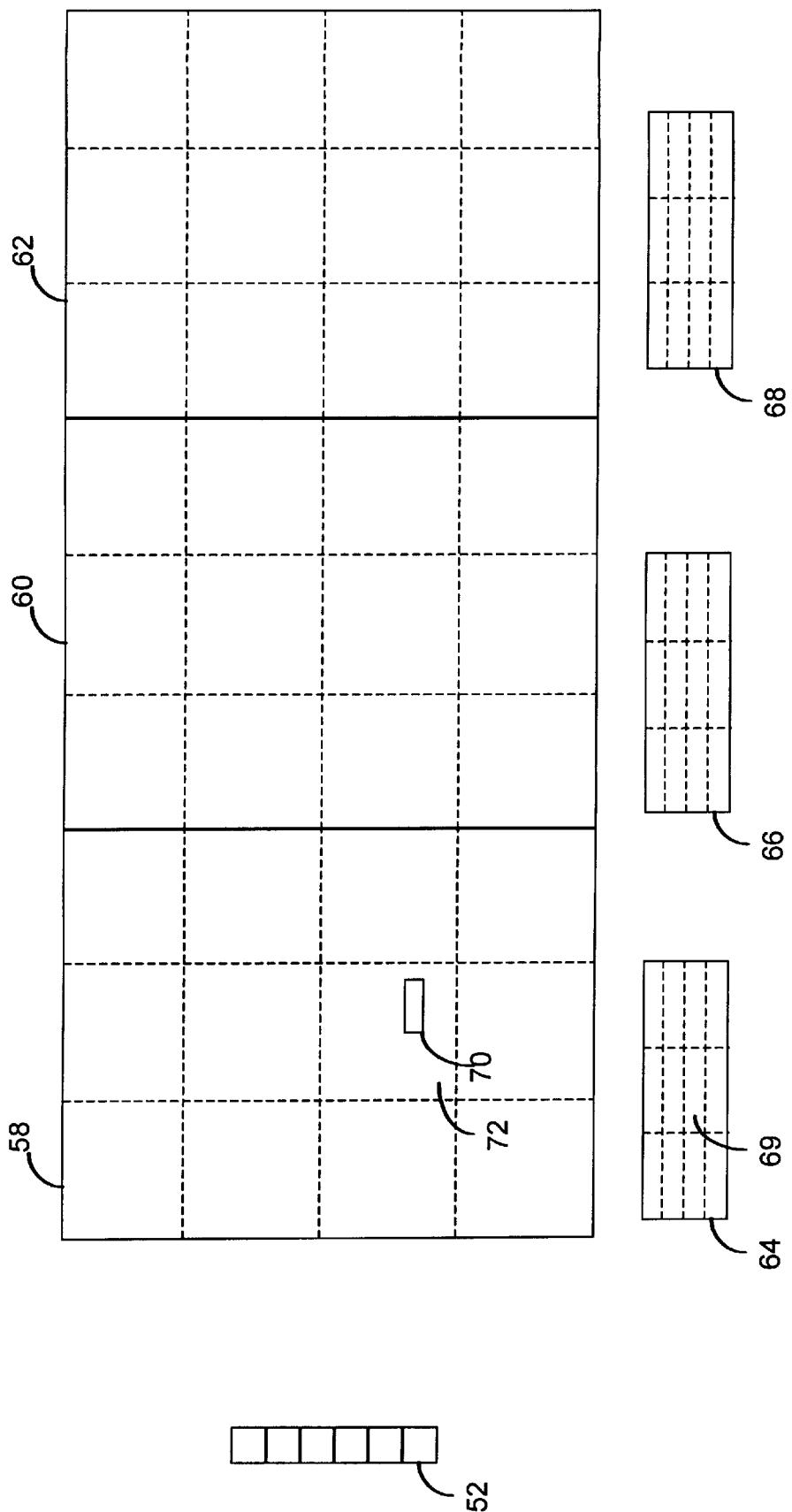
FIG. 6 is a diagram that illustrates a garbage-collected heap's organization into generations.
Figure 7:
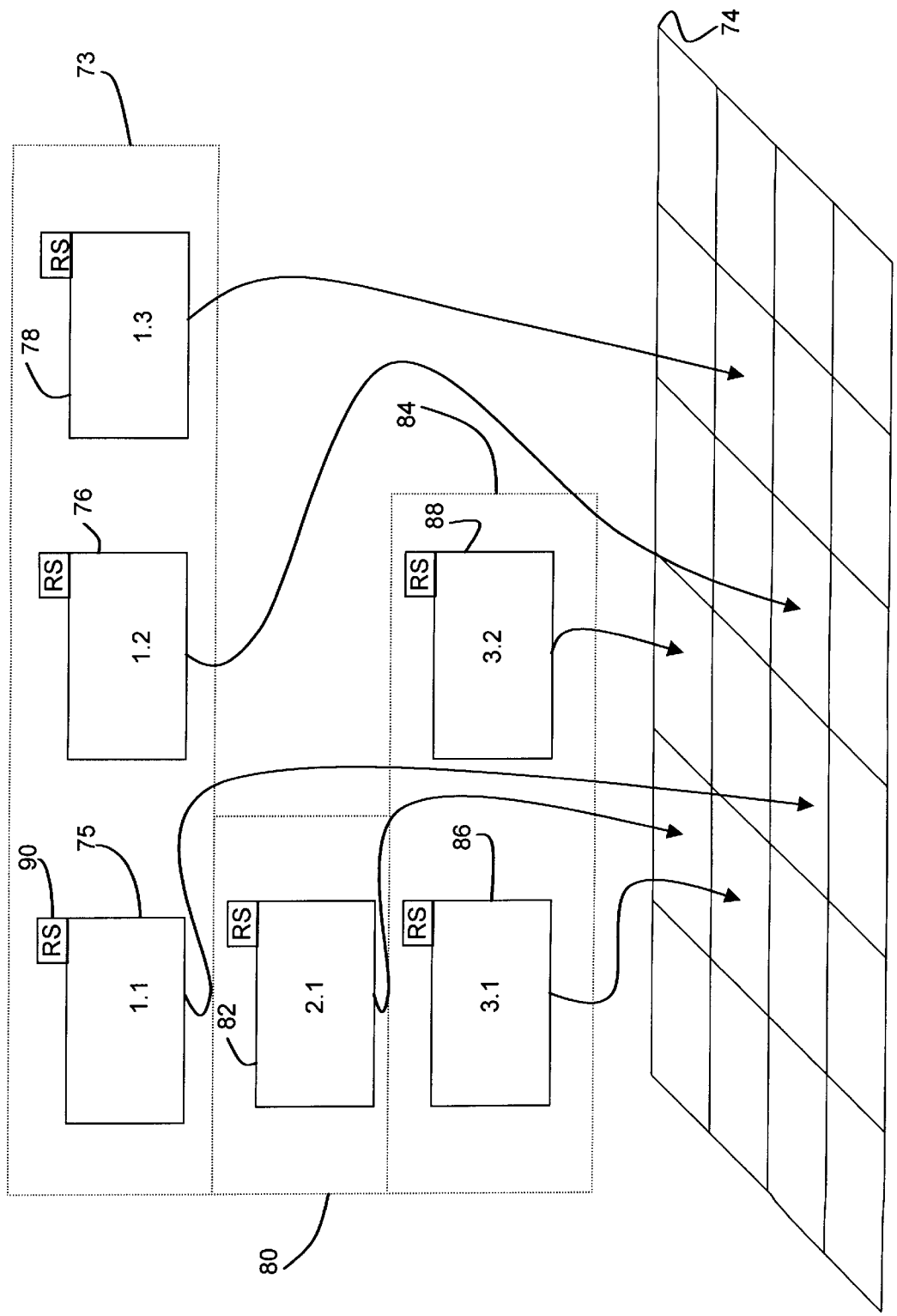
FIG. 7 is a diagram that illustrates a generation organization employed for the train algorithm.

To implement this feature, the collector maintains for each such segment at least an oldest-train value, preferably as part of a farthest-forward-car value. That farthest-forward-car value identifies the farthest-forward (same-generation) car to which a reference in that segment refers. The segments used for this purpose need not be of the same size as cards depicted in FIG. 6 for tracking inter-generation references. Indeed, this feature can be used without implementing the card-table approach to inter-generation-reference tracking. But the term cards will be used here to refer to the segments with which the collector associates the farthest-forward-car values, because it is convenient to use the same size for both purposes.

In particular, the collector updates its farthest-forward-car values at the beginning of each collection cycle for all of a generation's cards that a write barrier employed for that purpose has identified as having been modified since the last collection cycle. So the write barrier used to identify cards whose modifications may necessitate card-table or remembered-set updates can also be used to identify those that may need their farthest-forward-car values updated. And the card-inspection operation used to re-summarize those cards' inter-generation references can additionally include steps for updating the farthest-forward-car values. In such implementations, in other words, the farthest-forward-car value can be thought of as another field in each of FIG. 6's card-table entries.

In one exemplary approach, the farthest-forward-car value identifies the oldest train and farthest-forward car by taking the form of a pointer to the farthest-forward car section's car structure. (In embodiments in which the "farthest-forward-car" value is actually used only to identify the oldest train, it may take the form of a pointer to the train structure.) When a card is first allocated, this pointer's value is NULL. It remains NULL so long as scans of that card triggered by that card's modifications between collection cycles detect no references to cars farther forward than the one that includes that card.

When the write barrier has marked that card as modified since the last collection cycle, the collector sets that card's farthest-forward-car value to NULL before scanning it. Then, when it finds a reference into a farther-forward car, it not only updates that referred-into car section's remembered set, as was mentioned above, but also updates the scanned card's farthest-forward-car value.

Specifically, the collector compares the train and car values indicated by the referred-to car section's car structure with the train and car values indicated by the car structure to which the scanned card's current farthest-forward-car value points. If that comparison indicates that the referred-into car section is farther forward than the car section identified by the current farthest-forward-car value-or if the current farthest-forward-car value is NULL—the collector replaces the scanned card's current farthest-forward-car value with a pointer to the referred-into car section's car structure.

Figure 18:
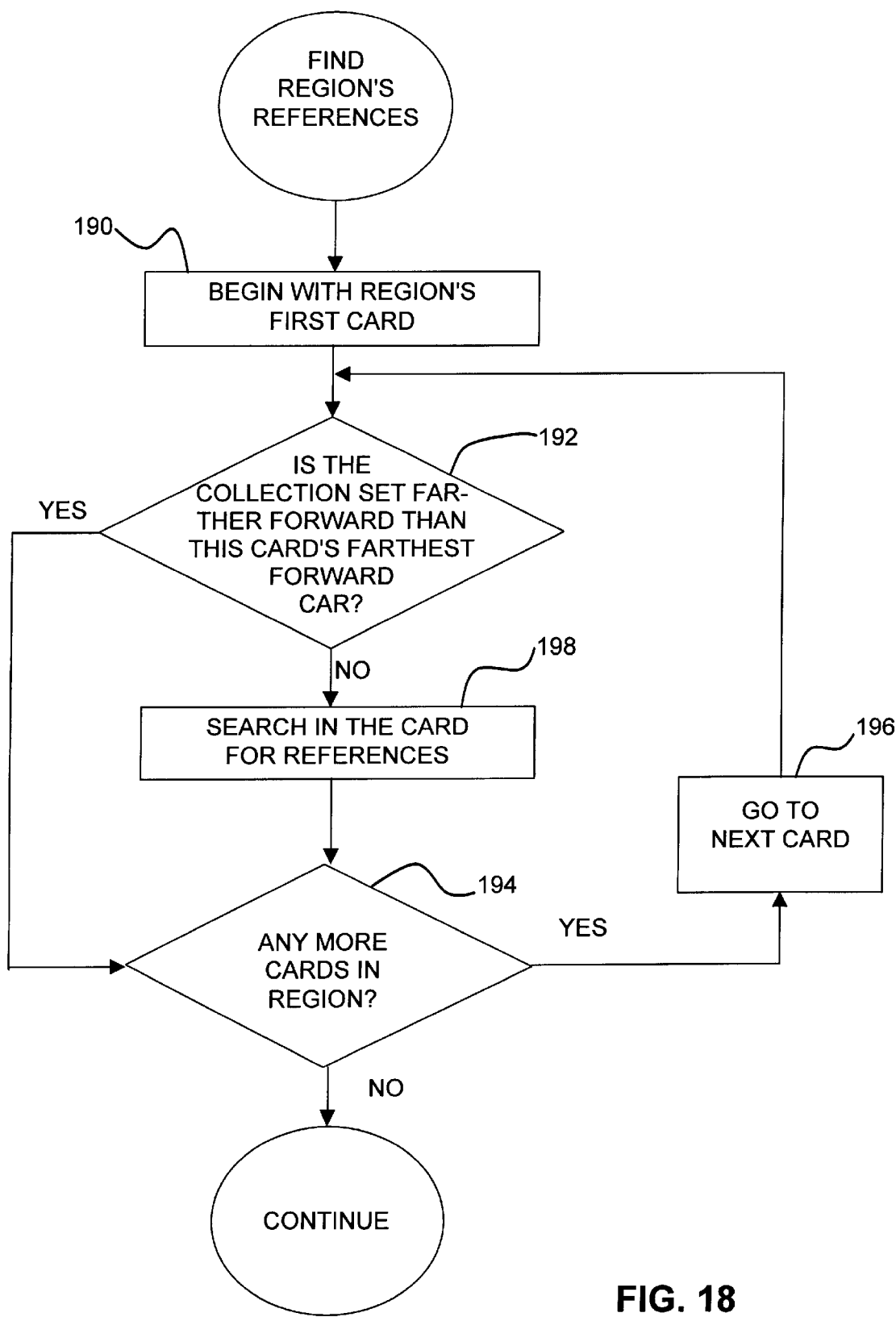
FIG. 18 is a flow chart of the procedure employed to search for references in a region that a remembered-set entry identifies.

When the collector is to search a remembered-set-identified region for references into the collection set, it follows a procedure like the one that FIG. 18 depicts. As block 190 indicates, the collector begins with the first card in the region that the remembered-set entry identifies. Before it inspects the card, it consults the farthest-forward-car value that it has maintained for this card. If every collection-set car is farther forward than the car thereby identified, it can skip the current card and proceed to any further cards in the region, as blocks 192, 194, and 196 indicate. Blocks 192 and 198 indicate that the card needs to be searched only when a card's farthest-forward-car value identifies a car at least as far forward as a car in the collection set. Actually, this is a slight over-simplification, as will be explained after a description of a particularly advantageous approach to making block 192's determination.

This approach involves having placed collection-set indicators in collection-set car sections' car structures. When a collector implementing this approach has identified collection-set members at the beginning of a collection cycle, it makes the various data-structure changes necessary to remove the collection-set car sections from their trains, and it provides a collection-set indicator in each collection-set car structure by setting a Boolean is_in_collection_set field (not shown in the drawings) that car structures employed by implementations of this approach include. Then, if the farthest-forward-car value involved in the block 192 determination points to a car structure containing such an indicator, that determination is negative, and the collector scans the associated card. If that car structure's is_in_collection_set field is not set, on the other hand, the determination is positive, and the associated card is not scanned.

The description above of the block 192 determination is slightly oversimplified, because the farthest-forward-car value may not point to any car at all. It may be NULL, for instance, indicating that the card contains no references into a farther-forward car. In that case, of course, the collector does not scan the associated card. But there may also be other reserved values that some embodiments recognize as not being valid pointers to car structures. For example, there may be a value, which we will call UNKNOWN, that the collector interprets as indicating that the card may contain references into cars farther forward but that the farthest-forward-car value does not point to the associated car structure. In that case, the collector would scan the associated card. In cases in which the region specified by the remembered-set entry contains the whole card, the collector may use that card scan additionally to update the farthest-forward car entry.

To see how an UNKNOWN value may occur, consider the situation at the end of a collection cycle. Any car section that was in the collection set has just been either reclaimed or relinked, so it is unlikely to be the farthest forward car section referred into from within a card whose farthest-forward-car value still points its car structure. That is, any such farthest-forward-car value would likely be invalid. But to update such farthest-forward-car values at the end of the collection cycle would be wasteful, since their associated cards may just end up being modified before the next collection cycle and require updating again.

A preferred approach is therefore simply to set such cards' farthest-forward-car values to UNKNOWN. Now, some embodiments may update any UNKNOWN farthest-forward-car value at the beginning of the next cycle, just as though its card had been modified. But a card that has references to objects whose cars have just been collected is more likely than others not to have references into farther-forward cars, so there is some economy in omitting such a step. If that approach is taken, the collector will typically update the value only at the point, if any, at which its card is actually encountered during remembered-set processing.

The frequency with which the UNKNOWN value is encountered can be reduced by providing for more than one farthest-forward car value for each card. When the "top" one or more of such values become invalid, the remaining values would "move up," and the lowest values replaced with UNKNOWN. The UNKNOWN values would be replaced during updating, possibly with NULL if there are not enough referred-into cars to fill the farthest-forward car-value stack.

Some embodiments may expedite the block 192 determination further by immediately setting to UNKNOWN the farthest-forward-car value associated with a card whose farthest-forward-car value points to a car structure that is determined in the block 192 step to be associated with a car section in the collection set. Although it is preferable to use the above-described use of the Boolean array to avoid repetitive scanning of the same region in a given collection cycle, not all collectors will use that feature. And it may be necessary to visit the same card more than once in a cycle even for embodiments that do. If a remembered-set entry specifies a region smaller than a card, for instance, the Boolean-entry approach will not necessarily prevent the region-containing card from being revisited. Without more, the collector would therefore have to repeat the process of following the farthest-forward-car value to the car structure and checking that structure for the collection-set indicator before it could conclude that it does indeed need to scan the region that the remembered-set entry identified.

By immediately setting the farthest-forward-car value to UNKNOWN, though, the collector avoids the need to repeat inspection of the car structure if that card is encountered again, since the UNKNOWN value will cause it to search in the associated card without doing so. Collectors that implement this feature will ordinarily leave the farthest-forward-car value equal to UNKNOWN in those situations in which the resultant scan reveals that the farthest forward car is indeed in the collection set. Otherwise, they will update the farthest-forward-car value by making it equal to a pointer to the farthest forward car.

Figure 8A:
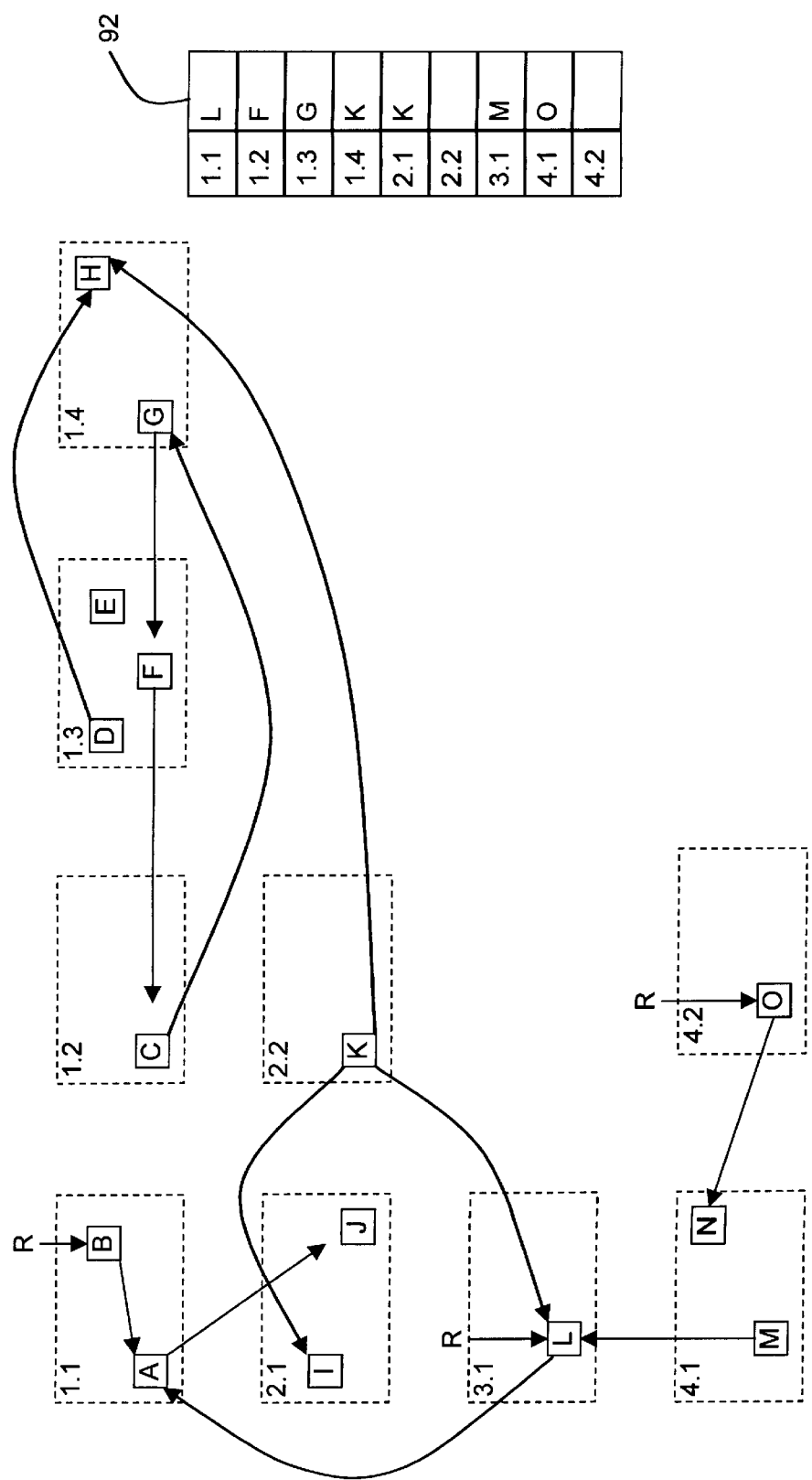
Figure 8B:
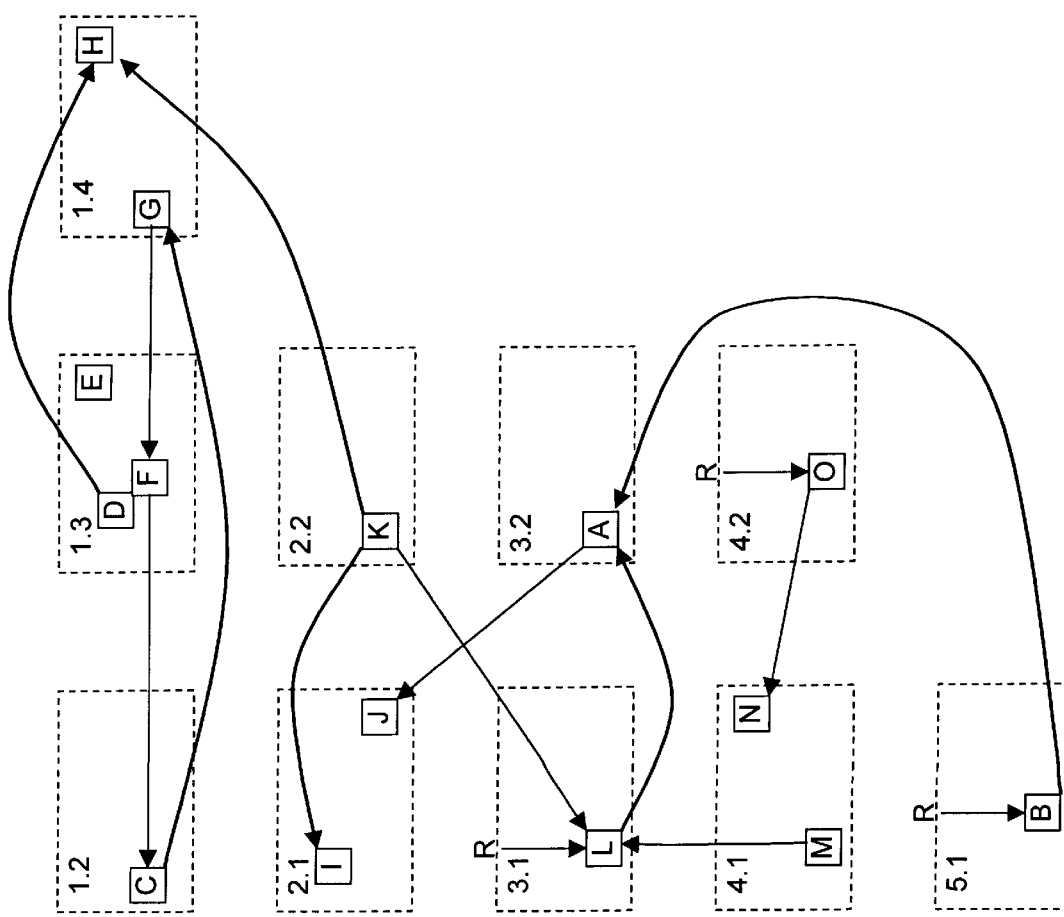
Figure 8C:
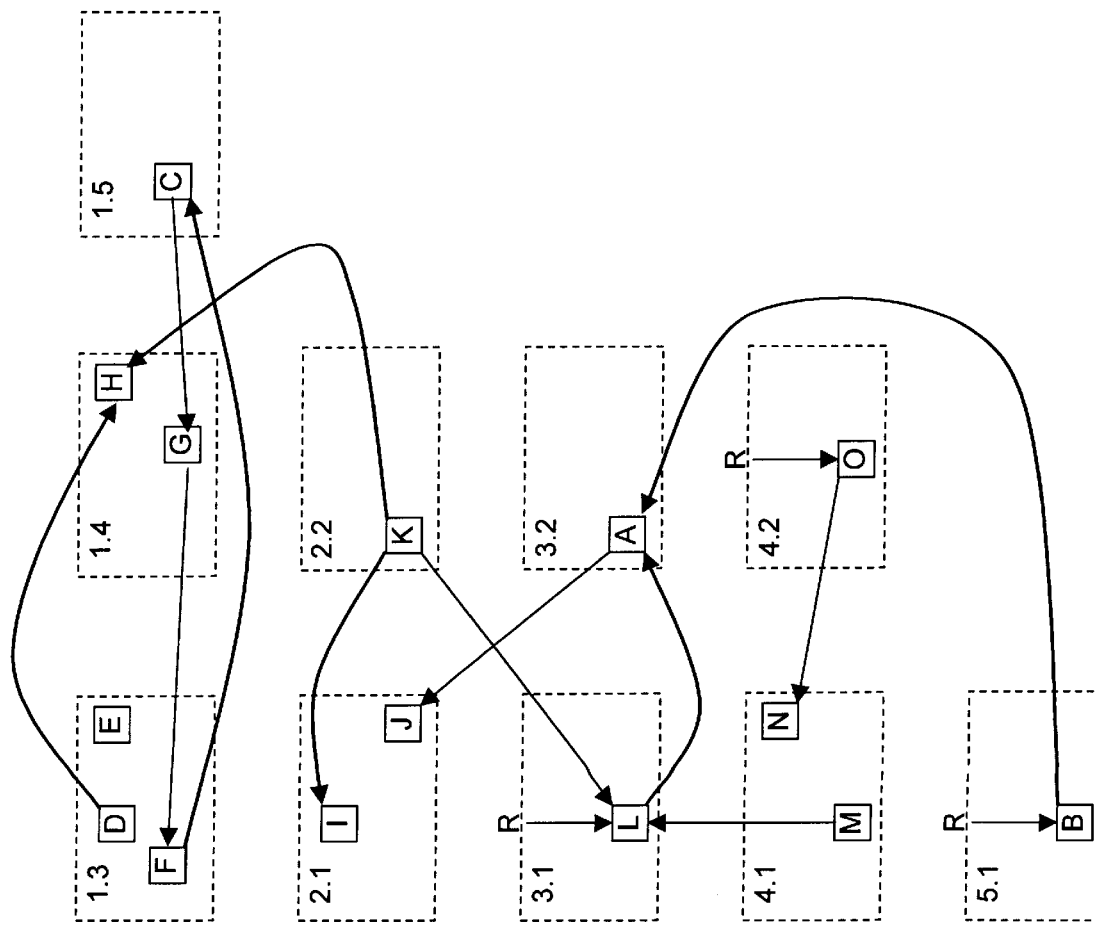
Figure 8D:
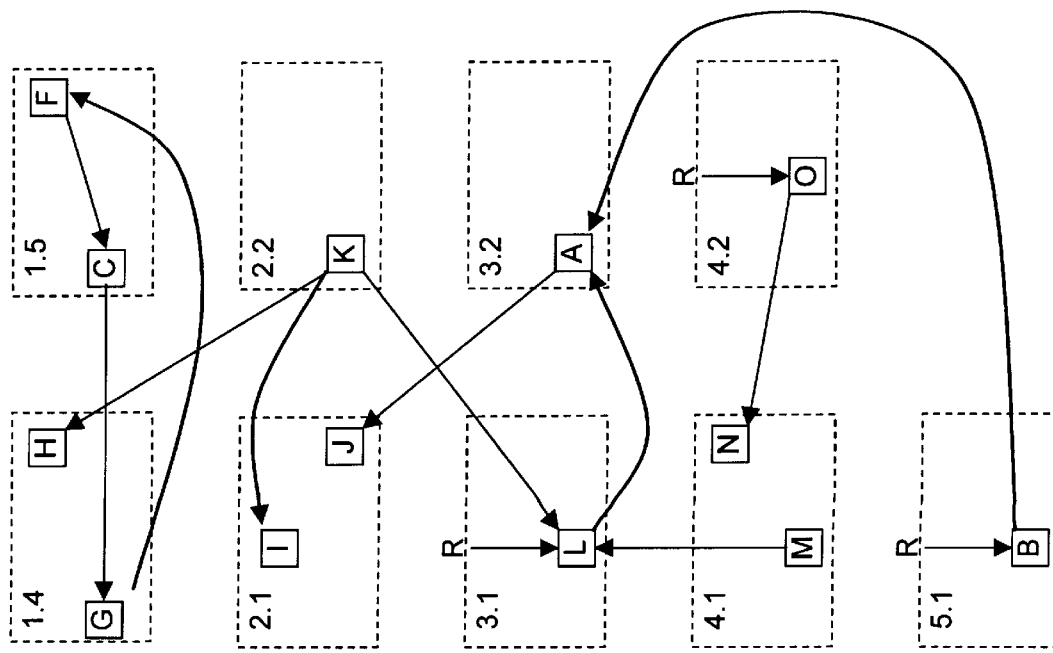
Figure 8E:
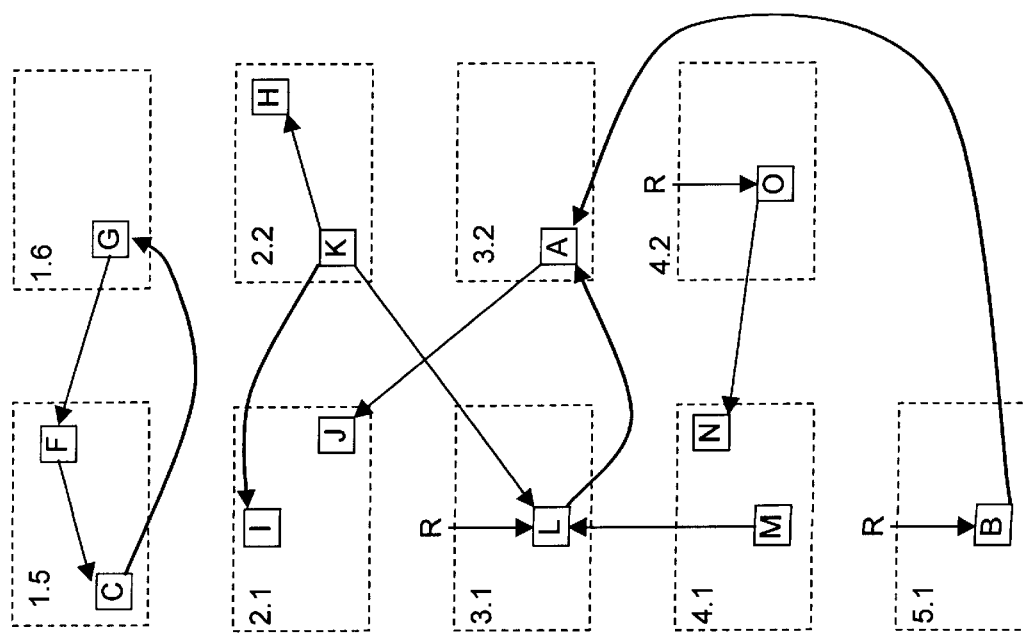
Figure 8F:
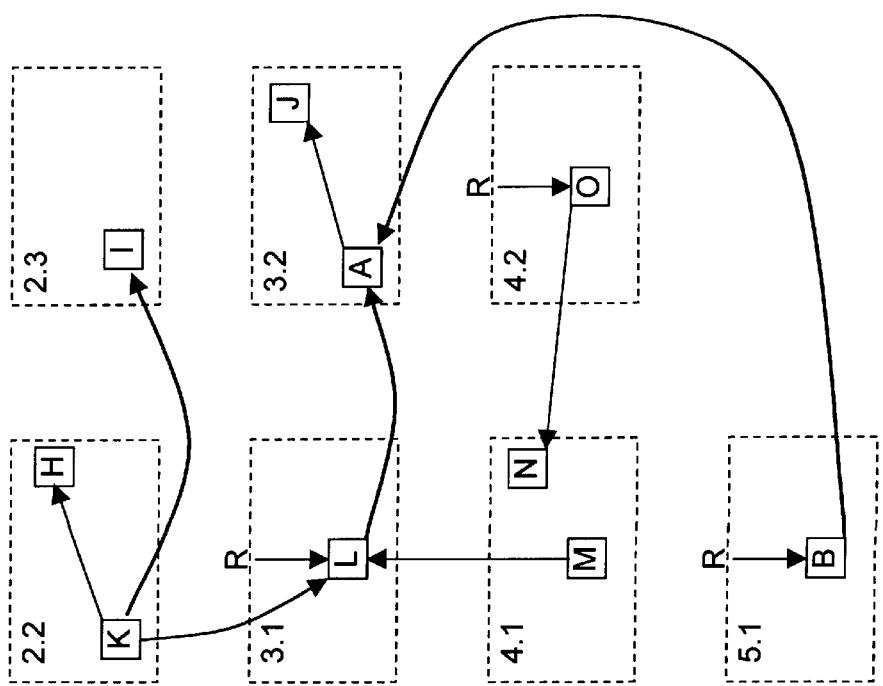
Figure 8I:
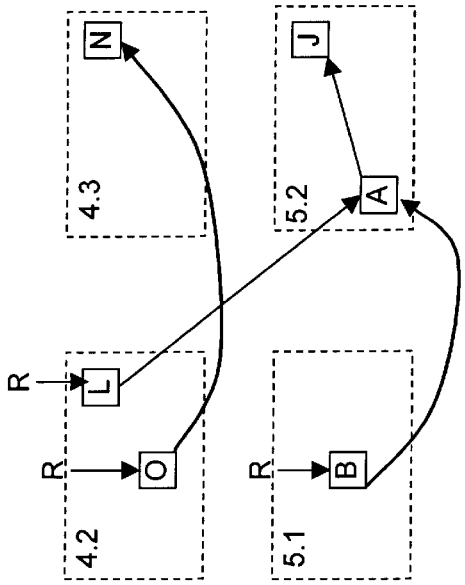
Figure 8J:
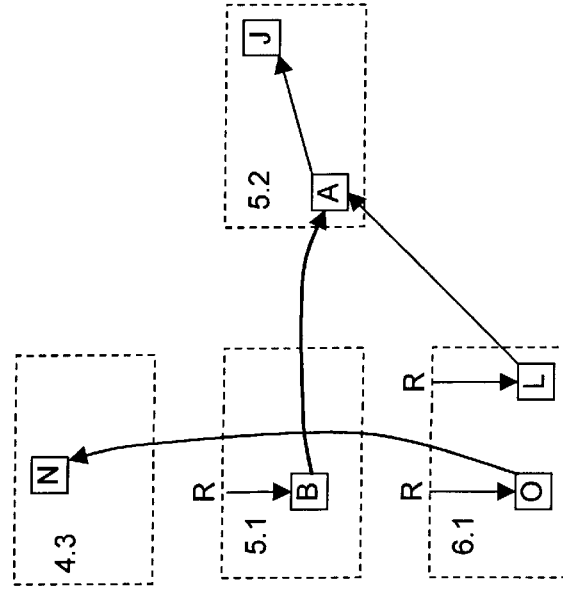

Note that the car farthest forward is not necessarily the one that is oldest chronologically. A comparison of FIGS. 8A and 8B illustrates this distinction. Those drawings show that car 3.2 came into existence later than car 4.2. But car 3.2 is farther forward than car 4.2, because it belongs to an older train. Indeed, one may employ the same general approach by using only oldest-train values, without also maintaining a value representing that oldest train's farthest-forward car containing a reference to an object in the associated segment.

Use of this feature tends to avoid searching in response to "stale" remembered-set entries. Recall in this connection that the approach to remembered-set maintenance described above normally updates a remembered set at the beginning of a collection cycle only when inspection of a card marked by the write barrier as modified reveals that the card has a reference into the car with which the remembered set is associated. But inspecting a modified card identifies only cars into which it now refers, not cars into which it previously referred. So this type of remembered-set update can only add entries; it cannot remove them. Remembered-set entries can therefore become stale. But use of farthest-forward-car values as just described reduces the number of searches through regions identified by stale remembered-set entries.

The illustrated embodiment also takes advantage of this fact in another way. The collector culls a remembered set before that set's associated car is collected. It does so by scanning the farthest-forward-car values associated with the cards that the remembered set's entries identify. If no car specified by the farthest-forward-car values associated with any of the cards in a given region thus identified is at least as far forward as the remembered set's car, the collector discards the entry that identified that region.

Now, one may initially conclude that this use of the farthest-forward-car values for advance culling is largely superfluous. After all, their use during the collection process virtually eliminates the stale entry's adverse effects. But further reflection reveals that this culling operation has a separate benefit. For one thing, even collectors that do not use the farthest-forward-car test during collection can use it for advance culling.

More important, though, is that such culling can improve the remembered-set up-date process. To appreciate this, consider the remembered-set-entry process that FIG. 14 illustrates. Its blocks 164 and 170 respectively represent increasing the remembered set's size and coarsening its granularity. Each of those steps includes copying entries from the space previously allocated to the set, possibly revising the entries, and placing the possibly revised entries into the remembered set's newly allocated space. So each such process presents a convenient opportunity to use the relevant farthest-forward-car values to ensure that no entry written into the new space is stale. In many cases, such culling will enable the collector to avoid or delay a further size increase or granularity coarsening.

By providing a way to limit selected remembered sets to fixed sizes, the present invention makes it possible not only to contain the burden that popular objects impose but also to obtain the benefits of single-object remembered sets with less overhead penalty. It therefore constitutes a significant advance in the art.

What is claimed is:

1. A method of garbage collection that includes treating a generation of a collected heap as divided into car sections that belong to trains in such a manner as to impose a collection sequence, maintaining remembered sets, associated with respective car sections, of remembered-set entries that identify regions containing inter-car references to objects contained in car sections with which those remembered sets are respectively associated, performing a remembered-set-update process by searching through the generation for references into the car sections with which the remembered sets are associated and adding to the remembered sets remembered-set entries that identify regions thereby found in car sections less forward in the collection sequence than the car sections with which the remembered sets are associated, and collecting the generation in collection cycles, in each of which a collection set of at least one car section is collected in accordance with the train algorithm and the remembered sets associated with each car section of the collection set are processed to identify objects that will survive the collection cycle, and wherein:

A) when the number of remembered-set entries in at least one, given remembered set associated with one, given car section that contains only a single, given object has reached a predetermined maximum, the remembered-set-update process includes increasing the number of remembered-set entries in the given remembered set no further; and B) when the given car section's turn for collection arrives and the regions identified by the given remembered set contain less than all the references to the given object found during the update process in car sections less forward than the given car section, the given car section is linked into a train independently of which regions identified by the given remembered set still contain references to the given object.

2. A method as defined in claim 1 wherein:

A) the remembered-set-update process includes maintaining a least-forward-train value for the given remembered set that identifies the least-forward train to which a car section belongs that contains a reference to the given object; and B) the given car section is linked into the train identified by the least-forward-train value.

3. A garbage collector that treats a generation of a collected heap as divided into car sections, so links the car sections into trains as to impose a collection sequence on the car sections, maintains remembered sets, associated with respective car sections, of remembered-set entries that identify regions containing inter-car references to objects contained in the car sections with which those remembered sets are respectively associated, performs a remembered-set-update process by searching through the generation for references into the car sections with which the remembered sets are associated and adding to the remembered sets remembered-set entries that identify regions thereby found in car sections less forward in the collection sequence than the car sections with which the remembered sets are associated, and collects the generation in accordance with the collection sequence in collection cycles, in each of which the garbage collector collects a collection set of at least one car section in accordance with the train algorithm and processes the remembered sets associated with each car section of the collection set to identify objects that will survive the collection cycle, and wherein:

A) the garbage collector limits to a predetermined maximum the number of remembered-set entries in at least a given remembered set associated with a respective, given car section that contains a given object set of at least one object in such a manner as to permit the given remembered set to omit an entry that identifies a region, located in a car section farther forward than the given car section, that contains a reference to an object in the given object set; and B) when the collection sequence reaches the given car section, the garbage collector's processing of the given remembered set comprises:
   i) making a remembered-set-omission determination of whether the remembered set may omit an entry that identifies a region, located in a car section farther forward than the given car section, that contains a reference to an object in the given object set; and
   ii) if so, linking the given car section into a train independently of which regions identified by the given remembered set contain references to the given set.

4. A garbage collector as defined in claim 3 wherein the garbage collector permits only remembered sets associated with car sections that contain at most one object to omit entries that identify regions, located in car sections farther forward than the car sections with which those remembered sets are associated, that contain references to objects in the car sections with which those remembered sets are associated.

5. A garbage collector as defined in claim 3 wherein, when the remembered-set-omission determination is that the given remembered set does not omit an entry that identifies a region, located in a car section farther forward than the given car section, that contains a reference to an object in the given object set, the garbage collector's processing of the given remembered set includes linking the given car section into the least-forward train into which is linked a car section that contains a region identified by an entry in the given remembered set.

6. A garbage collector as defined in claim 5 wherein the garbage collector permits only remembered sets associated with car sections that contain at most one object to omit entries that identify regions, located in car sections farther forward than the car sections with which those remembered sets are associated, that contain references to objects in the car sections with which those remembered sets are associated.

7. A garbage collector as defined in claim 3 wherein:

A) the remembered-set-update process includes maintaining for the given remembered set a least-forward-train value that identifies the least-forward train to which a car section belongs that contains a reference to an object in the object set; and B) when the given car section is linked into a train independently of which regions identified by the given remembered set contain references to objects in the given object set, the given car section is linked into the train identified by the least-forward-train value.

8. A garbage collector as defined in claim 7 wherein the garbage collector permits only remembered sets associated with car sections that contain at most one object to omit entries that identify regions, located in car sections farther forward than the car sections with which those remembered sets are associated, that contain references to objects in the car sections with which those remembered sets are associated.

9. A garbage collector as defined in claim 7 wherein, when the remembered-set-omission determination is that the given remembered set does not omit an entry that identifies a region, located in a car section farther forward than the given car section, that contains a reference to an object in the given object set, the garbage collector's processing of the given remembered set includes linking the given car section into the least-forward train into which is linked a car section that contains a region identified by an entry in the given remembered set.

10. A garbage collector as defined in claim 9 wherein the garbage collector permits only remembered sets associated with car sections that contain at most one object to omit entries that identify regions, located in car sections farther forward than the car sections with which those remembered sets are associated, that contain references to objects in the car sections with which those remembered sets are associated.

11. A garbage collector as defined in claim 3 wherein the garbage collector further so performs the remembered-set-update process for a second remembered set associated with a second car section, which contains a second object set of at least one object, as to require that the second remembered set contain an entry that identifies every region, located in a car section farther forward than the second car section, that contains a reference to an object in the second object set.

12. A garbage collector as defined in claim 11 wherein the garbage collector permits only remembered sets associated with car sections that contain at most one object to omit entries that identify regions, located in car sections farther forward than the car sections with which those remembered sets are associated, that contain references to objects in the car sections with which those remembered sets are associated.

13. A garbage collector as defined in claim 11 wherein the garbage collector imposes no limit on the number of remembered-set entries in the second remembered set.

14. A garbage collector as defined in claim 13 wherein the garbage collector permits only remembered sets associated with car sections that contain at most one object to omit entries that identify regions, located in car sections farther forward than the car sections with which those remembered sets are associated, that contain references to objects in the car sections with which those remembered sets are associated.

* * * * *